(12) United States Patent
Tokuyama et al.

(10) Patent No.: US 11,511,511 B2
(45) Date of Patent: Nov. 29, 2022

(54) FOAM SHEET

(71) Applicant: NITTO DENKO CORPORATION, Ibaraki (JP)

(72) Inventors: Hideyuki Tokuyama, Ibaraki (JP); Makoto Saito, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 64 days.

(21) Appl. No.: 16/960,136

(22) PCT Filed: Dec. 17, 2018

(86) PCT No.: PCT/JP2018/046278
§ 371 (c)(1),
(2) Date: Jul. 6, 2020

(87) PCT Pub. No.: WO2019/187388
PCT Pub. Date: Oct. 3, 2019

(65) Prior Publication Data
US 2021/0070011 A1    Mar. 11, 2021

(30) Foreign Application Priority Data
Mar. 26, 2018  (JP) .............................. JP2018-057890

(51) Int. Cl.
*B32B 5/18*    (2006.01)
*C09J 7/38*    (2018.01)
(Continued)

(52) U.S. Cl.
CPC .............. *B32B 5/18* (2013.01); *B32B 27/065* (2013.01); *B32B 27/308* (2013.01); *C09J 7/26* (2018.01);
(Continued)

(58) Field of Classification Search
None
See application file for complete search history.

(56) References Cited

U.S. PATENT DOCUMENTS

| 5,060,527 A | 10/1991 | Burgess |
| 8,153,250 B2 | 4/2012 | Nakayama et al. |
| (Continued) | | |

FOREIGN PATENT DOCUMENTS

| CN | 103305161 A | 9/2013 |
| CN | 103694914 A | 4/2014 |
| (Continued) | | |

OTHER PUBLICATIONS

International Search Report issued in corresponding International Patent Application No. PCT/JP2018/046278 dated Feb. 19, 2019, along with an English translation.
(Continued)

*Primary Examiner* — Chinessa T. Golden
(74) *Attorney, Agent, or Firm* — Hauptman Ham, LLP

(57) ABSTRACT

Provided is a foam sheet that can raise an electrostatic capacitance at the time of compression, and hence can improve sensitivity when used for an electrostatic capacitance sensor. The foam sheet includes: a foam layer; and a pressure-sensitive adhesive layer arranged on at least one side of the foam layer, wherein the foam sheet has a dielectric constant increase amount Q-P at 10% compression of 0.2 (F/m) or more, where P (F/m) represents a dielectric constant of the foam sheet immediately after the foam sheet has been left at rest under conditions of a temperature of 23° C. and a humidity of 50% for 2 hours, and Q (F/m) represents a dielectric constant of the foam sheet at a time when the foam sheet is compressed by 10% immediately after being left at rest under the conditions of a temperature of 23° C. and a humidity of 50% for 2 hours.

12 Claims, 4 Drawing Sheets

(51) Int. Cl.
*C09J 7/26* (2018.01)
*B32B 27/06* (2006.01)
*B32B 27/30* (2006.01)

(52) U.S. Cl.
CPC .......... *C09J 7/38* (2018.01); *B32B 2266/0242* (2013.01); *B32B 2266/06* (2013.01); *B32B 2405/00* (2013.01)

(56) References Cited

U.S. PATENT DOCUMENTS

| | | |
|---|---|---|
| 9,156,959 B2 | 10/2015 | Kato et al. |
| 10,378,983 B2 | 8/2019 | Shere et al. |
| 10,550,224 B2 | 2/2020 | Liu et al. |
| 10,557,061 B2 | 2/2020 | Komatsuzaki et al. |
| 10,752,811 B2 | 8/2020 | Liu et al. |
| 10,815,404 B2 | 10/2020 | Liu et al. |
| 2005/0031858 A1 | 2/2005 | Tachibana |
| 2008/0269373 A1 | 10/2008 | Liu et al. |
| 2010/0143685 A1 | 6/2010 | Nakayama et al. |
| 2012/0164414 A1 | 6/2012 | Nakayama et al. |
| 2013/0011657 A1 | 1/2013 | Kato et al. |
| 2014/0057091 A1 | 2/2014 | Krawinkel et al. |
| 2014/0356615 A1 | 12/2014 | Komatsuzaki et al. |
| 2015/0099112 A1 | 4/2015 | Saitou et al. |
| 2015/0109240 A1 | 4/2015 | Cho et al. |
| 2015/0307751 A1* | 10/2015 | Eckhardt .................. C09J 7/26 428/41.8 |
| 2016/0121576 A1 | 5/2016 | Sasaki et al. |
| 2016/0231098 A1 | 8/2016 | Otaka et al. |
| 2017/0199095 A1 | 7/2017 | Shere et al. |
| 2018/0215959 A1 | 8/2018 | Liu et al. |
| 2018/0215970 A1 | 8/2018 | Liu et al. |
| 2018/0237585 A1 | 8/2018 | Liu et al. |

FOREIGN PATENT DOCUMENTS

| | | |
|---|---|---|
| CN | 104144976 A | 11/2014 |
| CN | 105492859 A | 4/2016 |
| CN | 106662492 A | 5/2017 |
| CN | 107922814 A | 4/2018 |
| GB | 1082128 A | 9/1967 |
| JP | H5-186744 A | 7/1993 |
| JP | H7-040755 U | 7/1995 |
| JP | H10-1649 A | 1/1998 |
| JP | 2001-100216 A | 4/2001 |
| JP | 2002-309198 A | 10/2002 |
| JP | 2010-155969 A | 7/2010 |
| JP | 2012-238129 A | 12/2012 |
| JP | 2013-032492 A | 2/2013 |
| JP | 2016-183274 A | 10/2016 |
| JP | 2017-190432 A | 10/2017 |
| JP | 2017-203691 A | 11/2017 |
| WO | 87/07767 A1 | 12/1987 |
| WO | 2013/099755 A1 | 7/2013 |
| WO | 2014/098123 A1 | 6/2014 |
| WO | 2015/029834 A1 | 3/2015 |
| WO | 2016/204074 A1 | 12/2016 |
| WO | 2018/025568 A1 | 2/2018 |

OTHER PUBLICATIONS

Written Opinion issued in corresponding International Patent Application No. PCT/JP2018/046278 dated Feb. 19, 2019.
Office Action dated Dec. 13, 2021 for corresponding Chinese Patent Application No. 201880091784.X, along with an English machine translation.
Qi et al., "Application of Preformed Adhesives in Car body", AT&M 2015, vol. 12, p. 48-53, Dec. 20, 2015, along with an English translation, cited in NPL No. 1.
Office Action dated May 10, 2022 for corresponding Japanese Patent Application No. 2018-057890, along with an English machine translation (12 pages).
Office Action dated Jul. 26, 2022 for corresponding Chinese Patent Application No. 201880091784.X, along with an English machine translation (15 pages).
He et al., "Polymer Physics", Fudan University Press, vol. 1, Oct. 31, 1990, pp. 377-380, along with an English translation (16 pages), cited in NPL No. 1.
Li, "Design and Application of Sensor Technology", China Ocean Press, vol. 1, May 31, 2015, pp. 55-58, along with an English translation (14 pages), cited in NPL No. 1.
Notario et al., "Dielectric behavior of porous PMMA: From the micrometer to the nanometer scale", Polymer, vol. 17, Nov. 17, 2016, pp. 302-305 (4 pages), cited in NPL No. 1.

* cited by examiner

FOAM SHEET

CROSS REFERENCE TO RELATED APPLICATION

This application is a National Stage of International Application No. PCT/JP2018/046278, filed on Dec. 17, 2018, which designates the United States and was published in Japan, and which claims priority to Japanese Patent Application No. 2018-057890, filed on Mar. 26, 2018 in the Japan Patent Office. Both of the aforementioned applications are hereby incorporated by reference in their entireties.

TECHNICAL FIELD

The present invention relates to a foam sheet.

BACKGROUND ART

Hitherto, a foamed material has been used for the purpose of imparting, for example, a characteristic of absorbing an impact upon application of the impact (impact absorbability) during fixing of a display member or a member such as a camera or a lens, which is mounted on, for example, a personal digital assistant, such as a mobile phone, a smartphone, or a tablet, to a predetermined site (e.g., a casing). As such foamed material, there have been used: a foamed material obtained by subjecting a micro-cell urethane-based foam having a low degree of foaming and having a closed-cell structure, or highly foamed urethane to compression molding; a polyethylene-based foam having closed cells and having a foaming ratio of about 30 times; and the like. Specifically, there have been used, for example, a gasket formed of a polyurethane-based foam having a density of from 0.3 g/cm$^3$ to 0.5 g/cm$^3$ (Patent Literature 1), and a sealing material for an electric/electronic device formed of a foamed structural body having an average cell diameter of from 1 μm to 500 μm (Patent Literature 2).

In recent years, an electrostatic capacitance sensor has been incorporated into an electronic device, for example, a personal digital assistant, such as a mobile phone, a smartphone, or a tablet, in order to impart a new function thereto. The electrostatic capacitance sensor is generally configured to change a distance between two electrodes, to thereby achieve a conduction state and a non-conduction state. Between the two electrodes, there is generally arranged a dielectric, for example, an elastic body, such as a resin or a rubber, a metal plate, or a metal spring. However, such related-art dielectric does not have sufficient flexibility, and hence has a problem in that it is difficult to obtain high sensitivity.

The inventors of the present invention have made an investigation as to whether or not there is a material having higher flexibility as the dielectric to be arranged between the two electrodes, and as a result, have focused attention on applying a foam having high flexibility. However, a related-art foam itself has a low electrostatic capacitance, and hence shows little change in dielectric constant with a change in thickness. Accordingly, an improvement in sensitivity as an electrostatic capacitance sensor has not been achieved.

CITATION LIST

Patent Literature

[PTL 1] JP 2001-100216 A
[PTL 2] JP 2002-309198 A

SUMMARY OF INVENTION

Technical Problem

An object of the present invention is to provide a foam sheet that can raise an electrostatic capacitance at the time of compression, and hence, for example, can improve sensitivity when used for an electrostatic capacitance sensor.

Solution to Problem

According to one embodiment of the present invention, there is provided a foam sheet, including: a foam layer; and a pressure-sensitive adhesive layer arranged on at least one side of the foam layer, wherein the foam sheet has a dielectric constant increase amount Q-P at 10% compression of 0.2 (F/m) or more, where P (F/m) represents a dielectric constant of the foam sheet immediately after the foam sheet has been left at rest under conditions of a temperature of 23° C. and a humidity of 50% for 2 hours, and Q (F/m) represents a dielectric constant of the foam sheet at a time when the foam sheet is compressed by 10% immediately after being left at rest under the conditions of a temperature of 23° C. and a humidity of 50% for 2 hours.

In one embodiment, the foam sheet has a dielectric constant increase amount R-P at 50% compression of 0.3 (F/m) or more, where R (F/m) represents a dielectric constant of the foam sheet at a time when the foam sheet is compressed by 50% immediately after being left at rest under the conditions of a temperature of 23° C. and a humidity of 50% for 2 hours.

In one embodiment, the foam layer has a thickness of from 30 μm to 1,000 μm.

In one embodiment, the foam layer has an average cell diameter of from 10 μm to 200 μm.

In one embodiment, the foam layer has a porosity of from 20% to 80%.

In one embodiment, the foam layer has a closed cell ratio of from 0% to 80%.

In one embodiment, the foam layer is formed from a resin composition containing at least one kind selected from an acrylic polymer, a silicone-based polymer, a urethane-based polymer, an olefin-based polymer, an ester-based polymer, and a rubber.

In one embodiment, the pressure-sensitive adhesive layer has a thickness of from 5 μm to 300 μm.

In one embodiment, a pressure-sensitive adhesive forming the pressure-sensitive adhesive layer is at least one kind selected from an acrylic pressure-sensitive adhesive, a silicone-based pressure-sensitive adhesive, and a rubber-based pressure-sensitive adhesive.

In one embodiment, the foam sheet has a thickness of from 35 μm to 1,300 μm.

In one embodiment, the foam sheet of the present invention has a repulsive force at 50% compression of from 0.1 N/cm$^2$ to 20.0 N/cm$^2$, the repulsive force at 50% compression being measured as a repulsive force (N/cm$^2$) in conformity with a method of measuring a compression hardness described in JIS K 6767:1999 by dividing a stress (N) at a time when a sheet-shaped test piece cut out from the foam sheet so as to measure 30 mm wide by 30 mm long is compressed in a thickness direction thereof at a compression speed of 10 mm/min until a compression ratio of 50% is achieved, by an area of the test piece (9 cm$^2$) to convert the stress into a value per unit area (1 cm$^2$).

In one embodiment, the foam sheet of the present invention is used for an electrostatic capacitance sensor.

Advantageous Effects of Invention

According to the present invention, the foam sheet that can raise an electrostatic capacitance at the time of compression, and hence, for example, can improve sensitivity when used for an electrostatic capacitance sensor can be provided.

DESCRIPTION OF EMBODIMENTS

<<<<Foam Sheet>>>>

Figure 1:
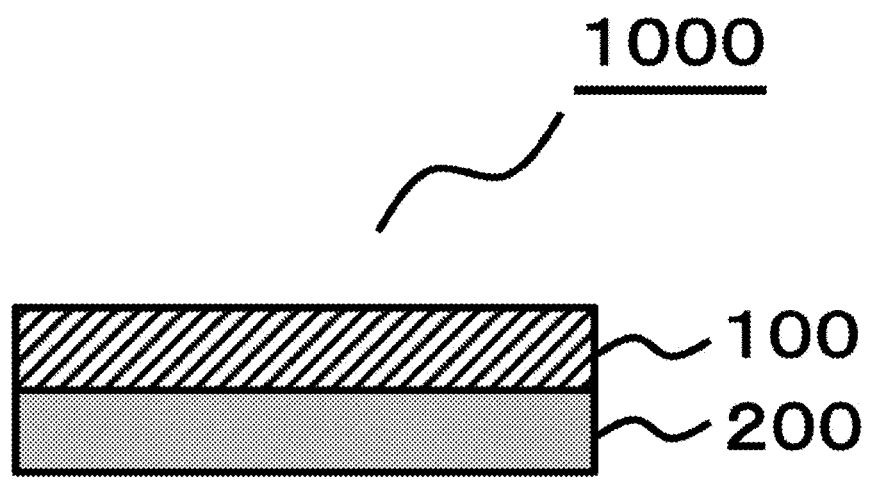
FIG. 1 is a schematic sectional view for illustrating a foam sheet according to one embodiment of the present invention.
Figure 2:
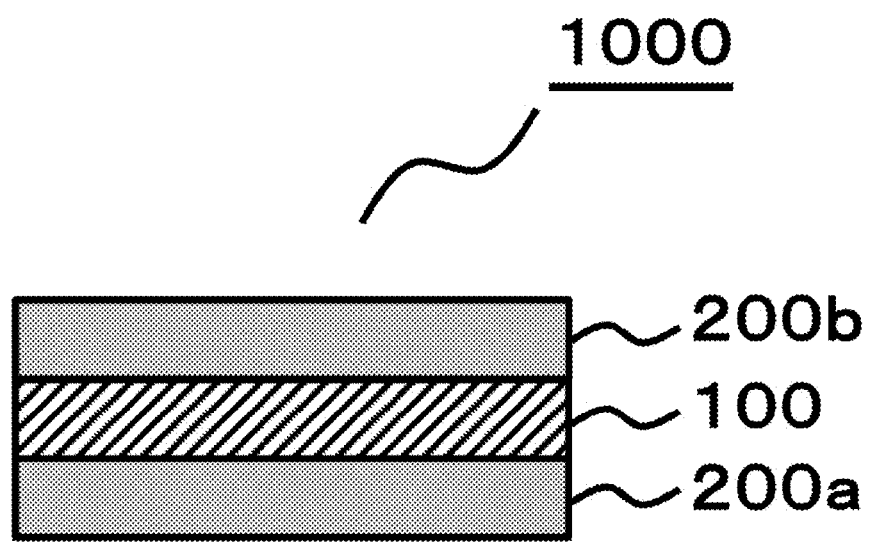
FIG. 2 is a schematic sectional view for illustrating a foam sheet according to another embodiment of the present invention.

A foam sheet of the present invention includes a foam layer and a pressure-sensitive adhesive layer arranged on at least one side of the foam layer. Specifically, an embodiment in which the foam sheet of the present invention includes a foam layer and a pressure-sensitive adhesive layer arranged on one side of the foam layer may be adopted, or an embodiment in which the foam sheet of the present invention includes a foam layer and pressure-sensitive adhesive layers arranged on both sides of the foam layer may be adopted. FIG. 1 is a schematic sectional view for illustrating a foam sheet according to one embodiment of the present invention, and a foam sheet 1000 includes a foam layer 100 and a pressure-sensitive adhesive layer 200 arranged on one side of the foam layer. FIG. 2 is a schematic sectional view for illustrating a foam sheet according to another embodiment of the present invention, and the foam sheet 1000 includes the foam layer 100, a pressure-sensitive adhesive layer 200a arranged on one side of the foam layer, and a pressure-sensitive adhesive layer 200b arranged on the other side of the foam layer.

The foam sheet of the present invention has a dielectric constant increase amount Q-P at 10% compression of 0.2 (F/m) or more, preferably 0.22 (F/m) or more, more preferably 0.25 (F/m) or more, still more preferably 0.27 (F/m) or more, particularly preferably 0.3 (F/m) or more, where P (F/m) represents the dielectric constant of the foam sheet immediately after the foam sheet has been left at rest under the conditions of a temperature of 23° C. and a humidity of 50% for 2 hours, and Q (F/m) represents the dielectric constant of the foam sheet at a time when the foam sheet is compressed by 10% immediately after being left at rest under the conditions of a temperature of 23° C. and a humidity of 50% for 2 hours. The upper limit of the dielectric constant increase amount Q-P at 10% compression is desirably as large as possible, but is practically preferably 3.0 (F/m) or less in consideration of actual use, such as use for an electrostatic capacitance sensor. By virtue of the dielectric constant increase amount Q-P at 10% compression of the foam sheet of the present invention falling within the above-mentioned ranges, the foam sheet of the present invention can raise an electrostatic capacitance at the time of compression, and hence, for example, can improve sensitivity when used for an electrostatic capacitance sensor.

The foam sheet of the present invention has a dielectric constant increase amount R-P at 50% compression of preferably 0.3 (F/m) or more, more preferably 0.4 (F/m) or more, still more preferably 0.6 (F/m) or more, still more preferably 0.8 (F/m) or more, still more preferably 1.0 (F/m) or more, still more preferably 1.2 (F/m) or more, particularly preferably 1.4 (F/m) or more, most preferably 1.5 (F/m) or more, where R (F/m) represents the dielectric constant of the foam sheet at a time when the foam sheet is compressed by 50% immediately after being left at rest under the conditions of a temperature of 23° C. and a humidity of 50% for 2 hours. The upper limit of the dielectric constant increase amount R-P at 50% compression is desirably as large as possible, but is practically preferably 4.0 (F/m) or less in consideration of actual use, such as use for an electrostatic capacitance sensor. By virtue of the dielectric constant increase amount R-P at 50% compression of the foam sheet of the present invention falling within the above-mentioned ranges, the foam sheet of the present invention can further raise an electrostatic capacitance at the time of compression, and hence, for example, can further improve sensitivity when used for an electrostatic capacitance sensor.

The thickness of the foam sheet of the present invention is preferably from 35 μm to 1,300 μm, more preferably from 40 μm to 1,000 μm, still more preferably from 45 μm to 900 μm, particularly preferably from 50 μm to 800 μm. When the thickness of the foam sheet of the present invention falls within the above-mentioned ranges, the foam sheet of the present invention can express excellent impact absorbability. In addition, when the thickness of the foam sheet of the present invention falls within the above-mentioned ranges, the foam sheet of the present invention can further raise an electrostatic capacitance at the time of compression, and hence, for example, can further improve sensitivity when used for an electrostatic capacitance sensor.

The foam sheet of the present invention has a repulsive force at 50% compression of preferably from 0.1 N/cm$^2$ to 20.0 N/cm$^2$, more preferably from 0.2 N/cm$^2$ to 18.0 N/cm$^2$, still more preferably from 0.5 N/cm$^2$ to 16.0 N/cm$^2$, particularly preferably from 0.8 N/cm$^2$ to 14.0 N/cm$^2$. When the repulsive force at 50% compression of the foam sheet of the present invention falls within the above-mentioned ranges, the foam sheet of the present invention can express excellent impact absorbability.

The repulsive force at 50% compression is measured as a repulsive force (N/cm$^2$) in conformity with a method of measuring a compression hardness described in JIS K 6767: 1999 by dividing a stress (N) at a time when a sheet-shaped test piece cut out from a foam sheet so as to measure 30 mm wide by 30 mm long is compressed in a thickness direction thereof at a compression speed of 10 mm/min until a compression ratio of 50% is achieved, by the area of the test piece (9 cm$^2$) to convert the stress into a value per unit area (1 cm$^2$).

<<Foam Layer>>

The foam layer has a cell structure. Examples of such cell structure include a closed-cell structure, an open-cell structure, and a semi-open and semi-closed-cell structure (cell structure in which a closed-cell structure and an open-cell structure are mixed). The cell structure of the foam layer is preferably an open-cell structure or a semi-open and semi-closed-cell structure because the effect of the present invention can be further expressed.

The thickness of the foam layer is preferably from 30 μm to 1,000 μm, more preferably from 35 μm to 900 μm, still more preferably from 40 μm to 800 μm, particularly preferably from 45 μm to 700 μm. When the thickness of the foam layer falls within the above-mentioned ranges, the foam sheet of the present invention can contain cells in a uniform manner, and can express excellent impact absorbability. Further, the foam sheet can easily follow even a minute clearance. In addition, when the thickness of the foam layer falls within the above-mentioned ranges, the foam sheet of the present invention can further raise an electrostatic capacitance at the time of compression, and hence, for example, can further improve sensitivity when used for an electrostatic capacitance sensor.

The average cell diameter of the foam layer is preferably from 10 μm to 200 μm, more preferably from 15 μm to 180 μm, still more preferably from 20 μm to 150 μm, particularly preferably from 25 μm to 100 μm. When the average cell diameter of the foam layer falls within the above-mentioned ranges, the foam sheet of the present invention can further express the effect of the present invention. In addition, the foam sheet can express excellent impact absorbability, and can also be excellent in compression recoverability. Further, the foam sheet can return to near its original thickness within a short period of time after being subjected to an impact, and hence can be excellent in durability against repeated impacts.

The ratio of the average cell diameter (μm) of the foam layer to its thickness (μm) (average cell diameter/thickness) is preferably from 0.1 to 0.8, more preferably from 0.15 to 0.7, still more preferably from 0.2 to 0.65, particularly preferably from 0.25 to 0.6 from the viewpoint that the effect of the present invention can be further expressed.

The maximum cell diameter of the foam layer is preferably from 40 μm to 400 μm, more preferably from 60 μm to 300 μm, still more preferably from 70 μm to 250 μm, particularly preferably from 80 μm to 220 μm. When the maximum cell diameter of the foam layer falls within the above-mentioned ranges, the foam sheet of the present invention can further express the effect of the present invention. In addition, the foam sheet can express excellent impact absorbability, and can also be excellent in compression recoverability. Further, the foam sheet can return to near its original thickness within a shorter period of time after being subjected to an impact, and hence can be excellent in durability against repeated impacts.

The minimum cell diameter of the foam layer is preferably from 5 μm to 70 μm, more preferably from 7 μm to 60 μm, still more preferably from 9 μm to 55 μm, particularly preferably from 10 μm to 50 μm. When the minimum cell diameter of the foam layer falls within the above-mentioned ranges, the foam sheet of the present invention can further express the effect of the present invention. In addition, the foam sheet can express excellent impact absorbability, and can also be excellent in compression recoverability. Further, the foam sheet can return to near its original thickness within a shorter period of time after being subjected to an impact, and hence can be excellent in durability against repeated impacts.

The porosity of the foam layer is preferably from 20% to 80%, more preferably from 25% to 77%, still more preferably from 30% to 75%, particularly preferably from 35% to 70%. When the porosity of the foam layer falls within the above-mentioned ranges, the foam sheet of the present invention can further express the effect of the present invention. In addition, the foam sheet can maintain its strength, and can express excellent impact absorbability.

The density of the foam layer is preferably from 0.2 g/cm$^3$ to 0.7 g/cm$^3$, more preferably from 0.21 g/cm$^3$ to 0.5 g/cm$^3$, still more preferably from 0.22 g/cm$^3$ to 0.4 g/cm$^3$, particularly preferably from 0.23 g/cm$^3$ to 0.35 g/cm$^3$. When the density of the foam layer falls within the above-mentioned ranges, the foam sheet of the present invention can further express the effect of the present invention. In addition, the foam sheet can maintain its strength, and can express excellent impact absorbability. Herein, the density of the foam layer means an "apparent density".

The closed cell ratio of the foam layer is preferably from 0% to 80%, more preferably from 0% to 70%, still more preferably from 0% to 60%, particularly preferably from 0% to 50%. When the closed cell ratio of the foam layer falls within the above-mentioned ranges, the foam sheet of the present invention can further express the effect of the present invention. In addition, the foam sheet can maintain its strength, and can express excellent impact absorbability.

The water content of the foam layer immediately after the foam sheet of the present invention has been left at rest under the conditions of a temperature of 60° C. and a humidity of 95% for 24 hours is preferably 60 wt % or less, more preferably 55 wt % or less, still more preferably 50 wt % or less, particularly preferably 45 wt % or less. When the water content of the foam layer falls within the above-mentioned ranges, the foam sheet of the present invention can further express the effect of the present invention. In addition, the foam sheet can maintain its strength, and can express excellent impact absorbability.

The thickness recovery ratio of the foam layer is preferably 70% or more, more preferably 80% or more, still more preferably 90% or more, particularly preferably 95% or more. When the thickness recovery ratio of the foam layer falls within the above-mentioned ranges, the foam sheet of the present invention can express excellent impact absorbability, and can also be excellent in compression recoverability. Further, the foam sheet can return to near its original thickness within a short period of time after being subjected to an impact, and hence can be excellent in durability against repeated impacts. In addition, the foam sheet can also be excellent in dust resistance and sealing property. In addition, when the thickness recovery ratio of the foam layer falls within the above-mentioned ranges, the foam sheet of the present invention can further raise an electrostatic capacitance at the time of compression, and hence, for example, can further improve sensitivity when used for an electrostatic capacitance sensor. The thickness recovery ratio of the foam layer is defined by the following equation. In addition, the thickness recovery ratio of the foam layer is sometimes referred to simply as "thickness recovery ratio after 0.5 second" of the foam layer. The thickness recovery ratio of the foam layer is a recovery ratio measured by compressing the foam sheet through the application of a load thereto over a certain amount of area, and is different from a so-called depression recovery ratio, which is measured by locally applying a load to the foam sheet to depress only a part thereof. Thickness recovery ratio (%)={(thickness after 0.5 second from release of compression state)/(initial thickness)}×100

Initial thickness: the thickness of the foam layer before the application of a load.

Thickness after 0.5 second from release of compression state: the thickness of the foam layer after 0.5 second from the release of compression after the foam layer has been maintained in a state of having a load of 100 g/cm$^2$ applied thereto for 120 seconds.

The peak top of the loss tangent (tan δ) of the foam layer, which is a ratio between its storage modulus of elasticity and loss modulus of elasticity at an angular frequency of 1 rad/s in dynamic viscoelasticity measurement, is preferably from −60° C. to 30° C., more preferably from −50° C. to 20° C., still more preferably from −40° C. to 10° C., particularly preferably from −30° C. to 0° C. When the loss tangent has two or more peak tops, it is preferred that at least one thereof fall within the above-mentioned ranges. When the peak top falls within the above-mentioned ranges, the foam sheet of the present invention can further express the effect of the present invention. In addition, the foam sheet can express excellent impact absorbability, and can also be excellent in compression recoverability. Further, the foam sheet can return to near its original thickness within a short period of time after being subjected to an impact, and hence can be excellent in durability against repeated impacts.

The peak-top intensity (maximum value) of the loss tangent (tan δ) in the range of from −60° C. to 30° C. is preferably as high as possible from the viewpoint of, for example, impact absorbability, and is preferably 0.2 or more, more preferably 0.3 or more. The upper limit of the peak-top intensity (maximum value) of the loss tangent (tan δ) in the range of from −60° C. to 30° C. is typically 2.0 or less.

In the foam layer, the ratio of the peak-top intensity of the loss tangent (tan δ) to the numerical value of the density (peak-top intensity/numerical value of density) is preferably from 1 to 5, more preferably from 1.5 to 4.5, still more preferably from 2 to 4, particularly preferably from 2.5 to 3.5. When the ratio falls within the above-mentioned ranges, the foam sheet of the present invention can further express the effect of the present invention. In addition, the foam sheet can express excellent impact absorbability, and can also be excellent in compression recoverability. Further, the foam sheet can return to near its original thickness within a shorter period of time after being subjected to an impact, and hence can be excellent in durability against repeated impacts.

The initial modulus of elasticity of the foam layer (value calculated from a slope at 10% strain in a tensile test under a 23° C. environment and at a tensile rate of 300 mm/min) is preferably 5 N/mm$^2$ or less, more preferably 3 N/mm$^2$ or less, still more preferably 2 N/mm$^2$ or less, particularly preferably 1 N/mm$^2$ or less. The lower limit of the initial modulus of elasticity is typically 0.1 N/mm$^2$ or more. When the initial modulus of elasticity of the foam layer falls within the above-mentioned ranges, the foam sheet of the present invention can express more excellent impact absorbability.

It is preferred that the foam layer have excellent impact absorbability. It is more preferred that the foam layer have high impact absorbability even for an extremely weak impact, and exhibit excellent impact absorbability irrespective of the magnitude of the impact. In an impact absorbability test using a pendulum impact tester, an impact force (F1) at a time when an impactor is caused to collide on a support plate of a structural body formed of the support plate and the foam layer may be used as an indicator of the impact absorbability. In addition, the impact absorbability may also be evaluated as an impact absorption rate R per unit thickness obtained by: determining an impact absorption rate (%), which is defined by the following equation, in the impact absorbability test using the pendulum impact tester; and dividing the impact absorption rate (%) by the thickness (μm) of the foam layer.

Impact absorption rate (%)={(F0−F1)/F0}×100

F0: an impact force at a time when the impactor is caused to collide with only the support plate.
F1: an impact force (impact absorbability) at a time when the impactor is caused to collide upon the support plate of the structural body formed of the support plate and the foam layer.

Figure 3:
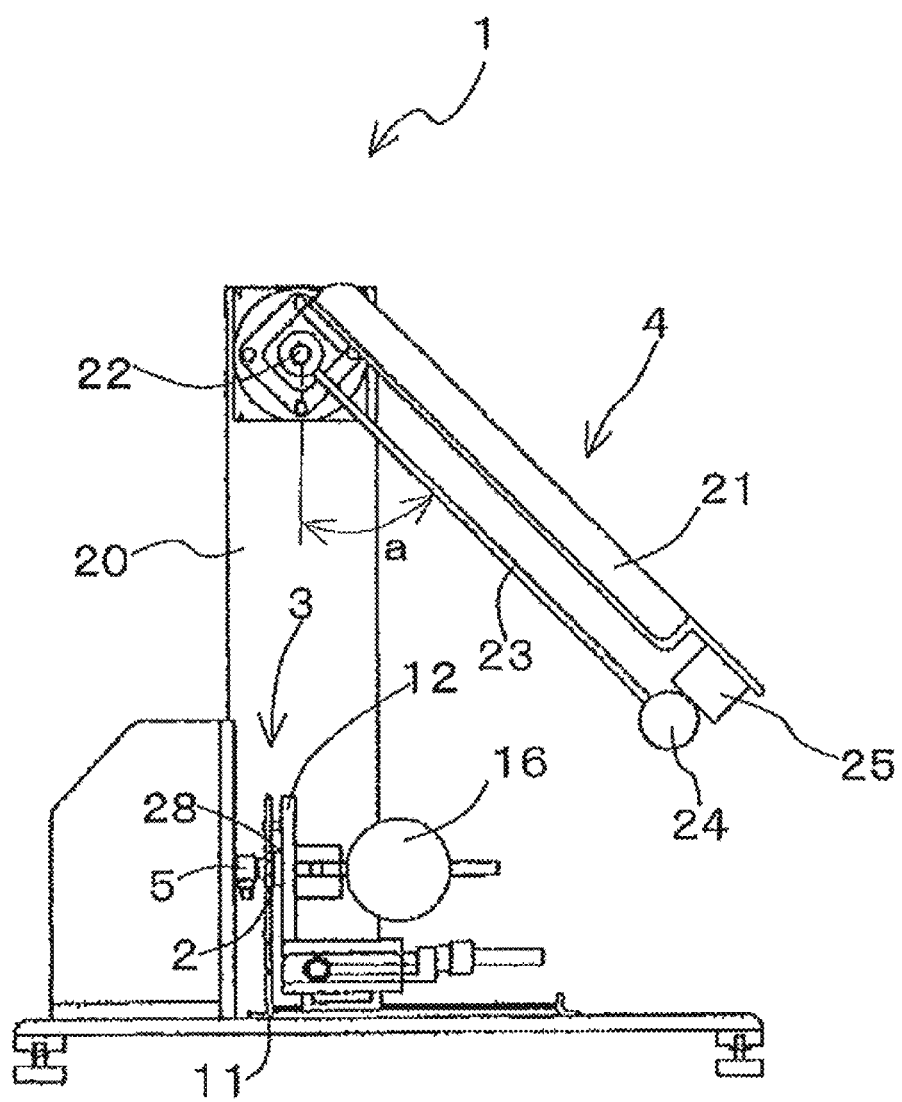
FIG. 3 is a schematic configuration view of a pendulum impact tester (impact test apparatus).
Figure 4:
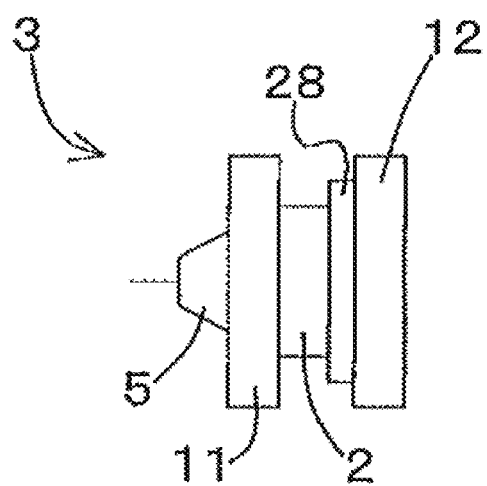
FIG. 4 is a schematic configuration view of a holding member of the pendulum impact tester (impact test apparatus).

A schematic configuration of the pendulum impact tester (impact test apparatus) is described with reference to FIG. 3 and FIG. 4. As illustrated in FIG. 3 and FIG. 4, an impact test apparatus 1 (pendulum tester 1) includes: a holding member 3 serving as holding means for holding a test piece 2 (foam layer 2) with any appropriate holding force; an impact applying member 4 configured to apply an impact stress to the test piece 2; a pressure sensor 5 serving as impact force detecting means for detecting an impact force applied by the impact applying member 4 to the test piece 2; and the like. In addition, the holding member 3 configured to hold the test piece 2 with any appropriate holding force includes a fixing jig 11 and a pressing jig 12 opposed to the fixing jig 11 and slidable so that the test piece 2 can be interposed and held therebetween. Further, the pressing jig 12 includes pressing pressure adjusting means 16. Further, the impact applying member 4 configured to apply an impact force to the test piece 2 held by the holding member 3 includes: a support rod 23 (shaft 23) having one end 22 axially supported on a support column 20 in a rotatable manner and having an impactor 24 on the other end side; and an arm 21 configured to lift and hold the impactor 24 at a predetermined angle. In this case, a steel ball is used as the impactor 24, and hence the arrangement of an electromagnet 25 at one end of the arm enables the impactor 24 to be integrally lifted at the predetermined angle. Moreover, the pressure sensor 5 configured to detect the impact force caused by the impact applying member 4 to act on the test piece 2 is arranged on the opposite surface side of the fixing jig 11 to the surface with which the test piece is brought into contact.

The impactor 24 is a steel ball (iron ball). In addition, the angle at which the impactor 24 is lifted by the arm 21 (swing-up angle a in FIG. 1) is 40°. The weight of the steel ball (iron ball) is 66 g.

As illustrated in FIG. 4, the test piece 2 (foam layer 2) is sandwiched between the fixing jig 11 and the pressing jig 12 via a support plate 28 formed of a highly elastic plate material, such as a resinous plate material (e.g., an acrylic plate or a polycarbonate plate) or a plate material made of a metal.

The impact absorption rate is calculated by the above-mentioned equation after the determination, with the impact test apparatus, of: the impact force F0 measured by closely fixing the fixing jig 11 and the support plate 28 to each other and then causing the impactor 24 to collide with the support plate 28; and the impact force F1 measured by inserting and closely fixing the test piece 2 between the fixing jig 11 and the support plate 28 and then causing the impactor 24 to collide with the support plate 28. The impact test apparatus is an apparatus similar to that of Example 1 of JP 2006-47277 A.

In the impact absorbability test using the pendulum impact tester, the impact force (F1: impact absorbability) at a time when the impactor is caused to collide upon the support plate of the structural body formed of the support plate and the foam layer is preferably 1,000 N or less, more preferably 900 N or less, still more preferably 800 N or less, particularly preferably 750 N or less. When the impact force falls within the above-mentioned ranges, the foam sheet of the present invention can express excellent impact absorbability. The lower limit of the impact force is typically preferably 0 N or more, more preferably 100 N or more, still more preferably 300 N or more, particularly preferably 500 N or more. The above-mentioned impact force is the impact force of the initial foam layer that has not been subjected to a large impact.

When the impact absorbability (F1) of the foam layer immediately after the foam sheet of the present invention has been left at rest under the conditions of a temperature of 23° C. and a humidity of 50% for 2 hours is represented by P (unit: N), and the impact absorbability (F1) of the foam layer immediately after the foam sheet has been left at rest under the conditions of a temperature of 60° C. and a humidity of 95% for 24 hours is represented by Q (unit: N), an impact absorbability change amount is preferably 10% or less, more preferably 9% or less, still more preferably 8% or less, particularly preferably 7% or less, most preferably 6% or less. Herein, the impact absorbability change amount is calculated by [(Y−X)×100]/X. By virtue of the impact absorbability change amount in the foam sheet of the present invention falling within the above-mentioned ranges, the foam sheet of the present invention can show a reduced change in impact absorbability even when exposed under a high-humidity condition.

In the impact absorbability test using the pendulum impact tester, when the impactor is caused to collide on the support plate of the structural body formed of the support plate and the foam layer 5 times in succession at intervals of 1 second, the slope of a linear approximation straight line obtained from five points by a least-squares method, the five points being plotted with an x-axis representing the number of times of impact and a y-axis representing an impact force (N), is preferably 10 or less, more preferably 5 or less, still more preferably 1 or less, particularly preferably 0.5 or less. When the slope falls within the above-mentioned ranges, the foam sheet of the present invention can be more excellent in durability against repeated impacts. The lower limit of the slope is typically preferably −5 or more.

In the impact absorbability test using the pendulum impact tester, when the impactor is caused to collide on the support plate of the structural body formed of the support plate and the foam layer 5 times in succession at intervals of 1 second, the increase ratio (%) of an impact force at the time of the fifth collision with respect to an impact force at the time of the first collision [{(impact force at time of fifth collision−impact force at time of first collision)/impact force at time of first collision}×100] is preferably 5% or less, more preferably 4% or less, still more preferably 3% or less, particularly preferably 2% or less. When the increase ratio falls within the above-mentioned ranges, the foam sheet of the present invention can be more excellent in durability against repeated impacts. The lower limit of the increase ratio is typically preferably −10% or more.

The foam layer has a thickness recovery ratio at high temperature of preferably 50% or more, more preferably 70% or more, still more preferably 80% or more, particularly preferably 90% or more. When the thickness recovery ratio at high temperature of the foam layer falls within the above-mentioned ranges, the foam sheet of the present invention can have a high recovery rate of its thickness after the application of an impact thereto even under a high-temperature environment (e.g., under an environment having a temperature of from 40° C. to 120° C.), and can be excellent in durability against repeated impacts under a high-temperature environment. The thickness recovery ratio at high temperature of the foam layer is defined by the following statement. In addition, the thickness recovery ratio at high temperature of the foam layer is sometimes referred to simply as "thickness recovery ratio at high temperature."

Thickness recovery ratio at high temperature: the ratio of the thickness of the foam layer after 24 hours from the release of a compression state to its initial thickness in the case where the foam layer is compressed in its thickness direction so as to have a thickness of 50% with respect to its initial thickness under an 80° C. atmosphere, and after a lapse of 22 hours, is left to stand under a 23° C. atmosphere for 2 hours, followed by the release of the compression state.

The foam layer may be formed from a resin composition containing a resin material (polymer). The peak top of the loss tangent (tan δ) of the resin composition in an unfoamed state (resin composition (solid) in the case of being not foamed), which is a ratio between its storage modulus of elasticity and loss modulus of elasticity at an angular frequency of 1 rad/s in dynamic viscoelasticity measurement, is preferably from −60° C. to 30° C., more preferably from −50° C. to 20° C., still more preferably from −40° C. to 10° C., particularly preferably from −30° C. to 0° C. When the loss tangent has two or more peak tops, it is preferred that at least one thereof fall within the above-mentioned ranges. When the peak top falls within the above-mentioned ranges, the foam sheet of the present invention can further express the effect of the present invention. In addition, the foam sheet can express excellent impact absorbability, and can also be excellent in compression recoverability. Further, the foam sheet can return to near its original thickness within a short period of time after being subjected to an impact, and hence can be excellent in durability against repeated impacts.

The peak-top intensity of the loss tangent (tan δ) of the resin composition in an unfoamed state (resin composition (solid) in the case of being not foamed) in the range of from −60° C. to 30° C. (this value corresponds to a value obtained by dividing the peak-top intensity of the loss tangent (tan δ) of the foam layer in the range of from −60° C. to 30° C. by the density (g/cm$^3$) of the foam layer) is preferably as high as possible from the viewpoint of, for example, impact absorbability, and is preferably 0.9 (g/cm$^3$)$^{-1}$ or more. The upper limit of the peak-top intensity (maximum value) of the loss tangent (tan δ) of the resin composition in an unfoamed state (resin composition (solid) in the case of being not foamed) in the range of from −60° C. to 30° C. is typically 3.0 (g/cm$^3$)$^{-1}$ or less.

The initial modulus of elasticity (23° C., tensile rate: 300 mm/min) of the resin composition in an unfoamed state (resin composition (solid) in the case of being not foamed) is preferably 50 N/mm$^2$ or less, more preferably 30 N/mm$^2$ or less. The lower limit of the initial modulus of elasticity is typically preferably 0.3 N/mm$^2$ or more.

The solvent-insoluble content (gel fraction) of the foam layer with respect to methyl ethyl ketone is preferably 80 wt % or more, more preferably 90 wt % or more. The upper limit of the solvent-insoluble content (gel fraction) of the foam layer with respect to methyl ethyl ketone is typically preferably 100 wt % or less.

The solvent-insoluble content (gel fraction) of the foam layer with respect to methyl ethyl ketone is determined as described below. About 0.2 g of a sample is obtained from the foam layer, and the sample is precisely weighed. The weight obtained by the precise weighing is defined as a "weight before storage (g)." Next, the sample is put into 50 g of methyl ethyl ketone (MEK), and stored under a room-temperature condition for 5 days. After that, the sample is removed from the methyl ethyl ketone, and the removed sample is dried at 130° C. for 1 hour. After the drying, the sample is left to stand under a room-temperature condition for 30 minutes, and then precisely weighed. The weight obtained by this precise weighing is defined as a "weight after storage (g)." Then, the solvent-insoluble content with respect to methyl ethyl ketone is calculated by the following equation.

Solvent-insoluble content of foam layer with respect to methyl ethyl ketone (wt %)={(weight after storage)/(weight before storage)}×100

Any appropriate resin material (polymer) may be adopted as the resin material (polymer) contained in the resin composition for forming the foam layer to the extent that the effect of the present invention is not impaired. Examples of such resin material include an acrylic polymer, a silicone-based polymer, a urethane-based polymer, an olefin-based polymer, an ester-based polymer, a rubber, and an ethylene-vinyl acetate copolymer. Of such resin materials (polymers), at least one kind selected from an acrylic polymer, a silicone-based polymer, a urethane-based polymer, an olefin-based polymer, an ester-based polymer, and a rubber is preferred because the foam sheet of the present invention can further express the effect of the present invention, can maintain its strength, and can express excellent impact absorbability. That is, the foam layer is preferably formed from a resin composition containing at least one kind selected from an acrylic polymer, a silicone-based polymer, a urethane-based polymer, an olefin-based polymer, an ester-based polymer, and a rubber.

In order to cause the peak top of the loss tangent (tan δ) of the foam layer, which is the ratio between its storage modulus of elasticity and loss modulus of elasticity at an angular frequency of 1 rad/s in dynamic viscoelasticity measurement, to fall within the range of from −60° C. to 30° C., the Tg of the resin material (polymer) may be used as an indicator or a guide. For example, the resin material (polymer) may be selected from resin materials (polymers) each having a Tg in the range of from −60° C. to 30° C. (its lower limit is preferably −50° C., more preferably −40° C., still more preferably −30° C., and its upper limit is preferably 20° C., more preferably 10° C., still more preferably 0° C.)

The foam layer may be produced by subjecting the resin composition containing the resin material (polymer) to foam forming. A method to be generally used for foam forming, such as a physical method or a chemical method, may be adopted as a foaming method (method of forming cells). That is, the foam layer may be obtained by shaping a foam formed through foaming by a physical method (physical foam) into a sheet, or may be obtained by shaping a foam formed through foaming by a chemical method (chemical foam) into a sheet. The physical method generally involves dispersing a gas component, such as air or nitrogen, in a polymer solution, and forming cells through mechanical mixing (mechanical foam). The chemical method is generally a method involving forming cells with a gas produced by the pyrolysis of a foaming agent added to a polymer base, to thereby obtain a foam.

As the resin composition to be subjected to foam forming, for example, a resin solution obtained by dissolving the resin material (polymer) and the like in a solvent may be used, or from the viewpoint of foamability, an emulsion containing the resin material (polymer) and the like may be used. The resin composition to be subjected to foam forming may be prepared by, for example, mixing constituent components through the use of any appropriate melt-kneading apparatus, such as an open-type mixing roll, a closed-type Banbury mixer, a single screw extruder, a twin screw extruder, a continuous kneader, or a pressurizing kneader. A blend of two or more kinds of emulsions may be used as the emulsion. In addition, the resin composition may be stored as a resin composition containing no cross-linking agent and mixed with a cross-linking agent immediately before being subjected to foam forming.

<First Embodiment for Forming Foam Layer>

As a first embodiment for forming the foam layer, there is given a method of forming the foam layer through a step of mechanically foaming an emulsion resin composition (emulsion containing the resin material (polymer) and the like) to produce cells (step A). In this case, the foam layer is preferably obtained by shaping a mechanical foam of the emulsion resin composition into a sheet. As a foaming apparatus, there are given, for example, an apparatus of a high-speed shearing system, an apparatus of a vibration system, and an apparatus of a pressurized gas-ejecting system. Of those foaming apparatus, an apparatus of a high-speed shearing system is preferred from the viewpoints of a reduction in cell diameter and large-volume production. The first embodiment for forming the foam layer is applicable to formation from any resin composition. The first embodiment for forming the foam layer is particularly preferably applicable to formation from a resin composition containing an acrylic polymer.

The solid content concentration of the emulsion is preferably as high as possible from the viewpoint of film formability. The solid content concentration of the emulsion is preferably 30 wt % or more, more preferably 40 wt % or more, still more preferably 50 wt % or more.

A cell when the resin composition is foamed by mechanical stirring is such that a gas is taken in an emulsion. Any appropriate gas may be adopted as the gas as long as the gas is inert to the emulsion to the extent that the effect of the present invention is not impaired. Examples of such gas include air, nitrogen, and carbon dioxide.

The foam layer may be obtained through a step of applying the emulsion resin composition (bubble-containing emulsion resin composition) foamed by the above-mentioned method onto a base material, followed by drying (step B). Examples of the base material include a release-treated plastic film (e.g., a release-treated polyethylene terephthalate film) and a plastic film (e.g., a polyethylene terephthalate film).

Any appropriate methods may be adopted as an application method and a drying method in the step B to the extent that the effect of the present invention is not impaired. The step B preferably includes: a preliminary drying step B1 of drying the bubble-containing emulsion resin composition applied onto the base material at 50° C. or more and less than 125° C.; and a main drying step B2 of further drying the composition at 125° C. or more and 200° C. or less after the preliminary drying.

The provision of the preliminary drying step B1 and the main drying step B2 can prevent the coalescence of cells and the rupture of the cells due to an abrupt temperature increase. Particularly in a foam sheet having a small thickness, the significance of the provision of the preliminary drying step B1 is large because the cells coalesce or rupture owing to an abrupt temperature increase. The temperature in the preliminary drying step B1 is preferably 50° C. or more and 100° C. or less. A time period for the preliminary drying step B1 is preferably from 0.5 minute to 30 minutes, more preferably from 1 minute to 15 minutes. The temperature in the main drying step B2 is preferably 130° C. or more and 180° C. or less, more preferably 130° C. or more and 160° C. or less. A time period for the main drying step B2 is preferably from 0.5 minute to 30 minutes, more preferably from 1 minute to 15 minutes.

<Second Embodiment for Forming Foam Layer>

As a second embodiment for forming the foam layer, there is given a method involving shaping a foam, which has been formed by foaming the resin composition with a foaming agent, into a sheet. A foaming agent to be generally used for foam forming may be used as the foaming agent, and a high-pressure inert gas is preferably used from the viewpoints of environmental protection and a low property of contaminating the object to be foamed. The second embodiment for forming the foam layer is particularly preferably applicable to formation from a resin composition containing an olefin-based polymer or a resin composition containing an ester-based polymer.

Any appropriate inert gas may be adopted as the inert gas as long as the gas is inert to, and can impregnate, the resin composition. Examples of such inert gas include carbon dioxide, a nitrogen gas, and air. Those gases may be used as a mixture. Of those, carbon dioxide is preferred from the viewpoint of impregnating the resin material (polymer) with a large amount and at a high rate.

The inert gas is preferably in a supercritical state. That is, carbon dioxide in a supercritical state is particularly preferably used. In the supercritical state, the solubility of the inert gas into the resin composition further increases. Consequently, the inert gas can be mixed at a high concentration into the composition, and besides, the inert gas has a high concentration at the time of an abrupt pressure reduction. Accordingly, the frequency of occurrence of cell nuclei increases, and the density of cells to be produced by the growth of the cell nuclei becomes larger than in any other state even with the same porosity. Thus, fine cells can be obtained. Carbon dioxide has a critical temperature of 31° C. and a critical pressure of 7.4 MPa.

As a method of forming a foam by impregnating the resin composition with the high-pressure inert gas, there is given, for example, a method of forming a foam through: a gas-impregnating step of impregnating the resin composition containing the resin material (polymer) with the inert gas under high pressure; a decompressing step of reducing the pressure after the gas-impregnating step to foam the resin material (polymer); and as required, a heating step of growing cells by heating. In this case, an unfoamed formed body that has been formed in advance may be impregnated with the inert gas, or a resin composition that has been melted may be impregnated with the inert gas under a pressurized state and then subjected to forming at the time of the decompression. Those steps may be performed by any of a batch system and a continuous system. That is, the steps may be performed by a batch system involving forming the resin composition into an appropriate shape, such as a sheet shape, to provide an unfoamed resin formed body in advance, then impregnating the unfoamed resin formed body with the high-pressure gas, and releasing the pressure of the gas to foam the formed body, or may be performed by a continuous system involving kneading the resin composition together with the high-pressure gas under increased pressure, and forming the kneaded product, and at the same time, releasing the pressure to simultaneously perform the forming and foaming of the kneaded product.

An example in which the foam is produced by the batch system is described below. For example, the resin composition is extruded with an extruder, such as a single screw extruder or a twin screw extruder, to thereby produce a resin sheet for foam forming. Alternatively, the resin composition is uniformly kneaded with a kneader including a blade of, for example, a roller-, cam-, kneader-, or Banbury-type, and the kneaded product is subjected to press processing into a predetermined thickness with, for example, a hot-plate press, to thereby produce an unfoamed resin formed body. The thus obtained unfoamed resin formed body is placed in a pressure vessel, and the high-pressure inert gas (e.g., carbon dioxide in a supercritical state) is injected to impregnate the unfoamed resin formed body with the inert gas. At the time point when the unfoamed resin formed body is sufficiently impregnated with the inert gas, the pressure is released (to typically atmospheric pressure) to produce cell nuclei in the resin. The cell nuclei may be directly grown at room temperature, but may be grown by being heated in some cases. A known or commonly used method, such as a water bath, an oil bath, a heat roll, a hot-air oven, a far-infrared ray, a near-infrared ray, or a microwave, may be adopted as a method for the heating. After cells have been thus grown, their shapes are fixed by abrupt cooling with, for example, cold water. Thus, the foam may be obtained. The unfoamed resin formed body to be subjected to foaming is not limited to a sheet-shaped product, and unfoamed resin formed bodies having various shapes may be used depending on applications. In addition, the unfoamed resin formed body to be subjected to foaming may be produced by any other forming method, such as injection molding, as well as extrusion molding or press forming.

An example in which the foam is produced by the continuous system is described below. For example, foam forming is performed by: a kneading and impregnating step of injecting (introducing) a high-pressure gas (in particular, an inert gas, more preferably carbon dioxide) while kneading the resin composition with an extruder, such as a single screw extruder or a twin screw extruder, to sufficiently impregnate the resin composition with the high-pressure gas; and a forming and decompressing step of extruding the resin composition through a die or the like arranged at the tip of the extruder to release the pressure (to typically atmospheric pressure), thereby simultaneously performing the forming and foaming of the composition. In addition, in the foam forming by the continuous system, a heating step of growing cells by heating may be provided as required. After the cells have been thus grown, their shapes may be fixed by abrupt cooling with, for example, cold water as required. In addition, the introduction of the high-pressure gas may be continuously performed, or may be discontinuously performed. Further, in the kneading and impregnating step and the forming and decompressing step, for example, an extruder or an injection molding machine may be used. A heating method at the time of the growth of cell nuclei is, for example, any appropriate method, such as a water bath, an oil bath, a heat roll, a hot-air oven, a far-infrared ray, a near-infrared ray, or a microwave. Any appropriate shape may be adopted as the shape of the foam. Examples of such shape include a sheet shape, a prism shape, a cylindrical shape, and a heteromorphic shape.

The mixing amount of the gas at the time of the foam forming of the resin composition is, for example, preferably from 2 wt % to 10 wt %, more preferably from 2.5 wt % to 8 wt %, still more preferably from 3 wt % to 6 wt % with respect to the total amount of the resin composition because a highly foamed foam can be obtained.

The pressure at the time of the impregnation of the resin composition with the inert gas may be appropriately selected in consideration of operability or the like. Such pressure is, for example, preferably 6 MPa or more (e.g., from 6 MPa to 100 MPa), more preferably 8 MPa or more (e.g., from 8 MPa to 50 MPa). The pressure in the case of using carbon dioxide in a supercritical state is preferably 7.4 MPa or more from the viewpoint of retaining the supercritical state of carbon dioxide. When the pressure is less than 6 MPa, cell growth at the time of the foaming is remarkable, and hence the cell diameter becomes so large that a preferred average cell diameter cannot be obtained in some cases. This is because of the following reason. When the pressure is low, the impregnation amount of the gas becomes relatively small as compared to that at the time of a high pressure, and hence a cell nucleus formation rate is reduced to decrease the number of cell nuclei to be formed. Accordingly, the amount of the gas per one cell is inversely increased, and hence the cell diameter becomes excessively large. In addition, in a pressure region of less than 6 MPa, even when the impregnation pressure is changed to a small extent, the cell diameter and a cell density are changed to a large extent, and hence the cell diameter and the cell density are liable to become difficult to control.

The temperature in the gas-impregnating step varies depending on, for example, the kinds of the inert gas to be used and components in the resin composition, and may be selected from a wide range. When operability or the like is taken into consideration, the temperature is preferably from 10° C. to 350° C. The impregnation temperature in the case of impregnating the unfoamed formed body with the inert gas by the batch system is preferably from 10° C. to 200° C., more preferably from 40° C. to 200° C. In addition, the impregnation temperature in the case of extruding a molten polymer impregnated with the gas to simultaneously perform the foaming and forming of the polymer by the continuous system is preferably from 60° C. to 350° C. When carbon dioxide is used as the inert gas, the temperature at the time of the impregnation is preferably 32° C. or more, more preferably 40° C. or more in order to retain the supercritical state of the gas.

In the decompressing step, a decompression rate is preferably from 5 MPa/sec to 300 MPa/sec in order to obtain uniform and fine cells.

A heating temperature in the heating step is preferably from 40° C. to 250° C., more preferably from 60° C. to 250° C.

<Resin Composition Containing Acrylic Polymer (Acrylic Resin Composition)>

The acrylic polymer is preferably an acrylic polymer formed from monomer components essentially including: a monomer (a) having a glass transition temperature Tg at the time of the formation of a homopolymer of −10° C. or more; and a monomer (b) having a glass transition temperature Tg at the time of the formation of a homopolymer of less than −10° C. When such acrylic polymer is adopted, the foam sheet of the present invention can further express the effect of the present invention.

Herein, the term "glass transition temperature Tg at the time of the formation of a homopolymer" (sometimes referred to simply as "Tg of a homopolymer") means the glass transition temperature Tg of the homopolymer of the monomer for forming that homopolymer. Specifically, a numerical value is listed in, for example, "Polymer Handbook" (3rd edition, John Wiley & Sons, Inc, 1987). The Tg of a homopolymer of a monomer that is not described in the literature refers to, for example, a value obtained by the following measurement method (see JP 2007-51271 A). That is, 100 parts by weight of the monomer, 0.2 part by weight of 2,2'-azobisisobutyronitrile, and 200 parts by weight of ethyl acetate serving as a polymerization solvent are loaded into a reactor including a temperature gauge, a stirring machine, a nitrogen-introducing tube, and a reflux condenser, and are stirred for 1 hour while a nitrogen gas is introduced into the reactor. After oxygen in a polymerization system has been removed as described above, a temperature in the reactor is increased to 63° C. and the mixture is subjected to a reaction for 10 hours. Next, the resultant is cooled to room temperature to provide a homopolymer solution having a solid content concentration of 33 wt %. Next, the homopolymer solution is cast and applied onto a separator, and is dried to produce a test sample having a thickness of about 2 mm (sheet-shaped homopolymer). Then, the test sample is punched into a disc shape having a diameter of 7.9 mm. The disc is sandwiched between parallel plates, and its viscoelasticity is measured with a viscoelasticity tester (ARES, manufactured by Rheometric Scientific, Inc.) in the temperature region of from −70° C. to 150° C. at a rate of temperature increase of 5° C./min by a shear mode while a shear strain having a frequency of 1 Hz is applied to the disc. The peak top temperature of the tan δ of the disc is defined as the Tg of the homopolymer. The Tg of the resin material (polymer) may also be measured by this method.

In the monomer (a) having a Tg of a homopolymer of −10° C. or more, the Tg is, for example, preferably from −10° C. to 250° C., more preferably from 10° C. to 230° C., still more preferably from 50° C. to 200° C.

Examples of the monomer (a) having a Tg of a homopolymer of −10° C. or more include: (meth)acrylonitrile; an amide group-containing monomer, such as (meth)acrylamide or N-hydroxyethyl (meth)acrylamide; (meth)acrylic acid; a (meth)acrylic acid alkyl ester having a Tg of a homopolymer of −10° C. or more, such as methyl methacrylate or ethyl methacrylate; isobornyl (meth)acrylate; a heterocycle-containing vinyl monomer, such as N-vinyl-2-pyrrolidone; and a hydroxyl group-containing monomer, such as 2-hydroxyethyl methacrylate. The number of kinds of the monomers (a) each having a Tg of a homopolymer of −10° C. or more may be only one, or two or more. Of those, the monomer (a) having a Tg of a homopolymer of −10° C. or more is preferably (meth)acrylonitrile, more preferably acrylonitrile. When (meth)acrylonitrile (preferably acrylonitrile) is adopted as the monomer (a) having a Tg of a homopolymer of −10° C. or more, its intermolecular interaction, which is estimated to be strong, enables the foam sheet of the present invention to further express the effect of the present invention.

In the monomer (b) having a Tg of a homopolymer of less than −10° C., the Tg is preferably −70° C. or more and less than −10° C., more preferably from −70° C. to −12° C., still more preferably from −65° C. to −15° C.

The monomer (b) having a Tg of a homopolymer of less than −10° C. is, for example, a (meth)acrylic acid alkyl ester having a Tg of a homopolymer of less than −10° C., such as ethyl acrylate, butyl acrylate, or 2-ethylhexyl acrylate. The number of kinds of the monomers (b) each having a Tg of a homopolymer of less than −10° C. may be only one, or two or more. Of those, an acrylic acid C2-8 alkyl ester is preferred. Herein, the term "Cx-y alkyl ester" means an ester of an alkyl group having x to y carbon atoms.

The content of the monomer having a Tg of a homopolymer of −10° C. or more with respect to the monomer components forming the acrylic polymer (all monomer components) is preferably from 2 wt % to 30 wt %, more preferably from 3 wt % to 25 wt %, still more preferably from 4 wt % to 20 wt %, particularly preferably from 5 wt % to 15 wt %. When the content of the monomer having a Tg of a homopolymer of −10° C. or more with respect to the monomer components forming the acrylic polymer (all monomer components) falls within the above-mentioned ranges, the foam sheet of the present invention can further express the effect of the present invention.

The content of the monomer having a Tg of a homopolymer of less than −10° C. with respect to the monomer components forming the acrylic polymer (all monomer components) is preferably from 70 wt % to 98 wt %, more preferably from 75 wt % to 97 wt %, still more preferably from 80 wt % to 96 wt %, particularly preferably from 85 wt % to 95 wt %. When the content of the monomer having a Tg of a homopolymer of less than −10° C. with respect to the monomer components forming the acrylic polymer (all monomer components) falls within the above-mentioned ranges, the foam sheet of the present invention can further express the effect of the present invention.

Any appropriate content ratio may be adopted as the content ratio of the acrylic polymer in the acrylic resin composition to the extent that the effect of the present invention is not impaired. The content ratio of the acrylic polymer in the acrylic resin composition is preferably from 30 wt % to 100 wt %, more preferably from 50 wt % to 100 wt %, still more preferably from 70 wt % to 100 wt %, particularly preferably from 90 wt % to 100 wt % in terms of solid content.

The acrylic resin composition may contain any appropriate other component in addition to the acrylic polymer to the extent that the effect of the present invention is not impaired. The number of kinds of the other components may be only one, or two or more. Examples of such other component include a surfactant, a cross-linking agent, a thickener, a rust inhibitor, and a silicone-based compound. Of those other components, a cross-linking agent and a silicone-based compound are preferred because the effect of the present invention can be further expressed.

The acrylic resin composition may contain any appropriate surfactant for, for example, a reduction in cell diameter and the stability of formed cells to the extent that the effect of the present invention is not impaired.

Examples of the surfactant include an anionic surfactant, a cationic surfactant, a nonionic surfactant, and an amphoteric surfactant. The surfactant is preferably an anionic surfactant from the viewpoints of a reduction in cell diameter and the stability of formed cells, and specific examples thereof include fatty acid ammonium-based surfactants, such as ammonium stearate. The number of kinds of the surfactants may be only one, or two or more. In addition, different kinds of surfactants may be used in combination, and for example, an anionic surfactant and a nonionic surfactant, or an anionic surfactant and an amphoteric surfactant may be used in combination.

When the acrylic resin composition contains the surfactant, the content (solid content (nonvolatile content)) of the surfactant is preferably more than 0 parts by weight and 10 parts by weight or less, more preferably from 0.5 part by weight to 8 parts by weight with respect to 100 parts by weight of the solid content (nonvolatile content) of the acrylic polymer.

The acrylic resin composition may contain any appropriate cross-linking agent in order to improve the strength, heat resistance, and moisture resistance of the foam sheet to the extent that the effect of the present invention is not impaired.

The cross-linking agent may be oil-soluble, or may be water-soluble.

Examples of the cross-linking agent include an epoxy-based cross-linking agent, an oxazoline-based cross-linking agent, an isocyanate-based cross-linking agent, a carbodiimide-based cross-linking agent, a melamine-based cross-linking agent, a silicone-based cross-linking agent (e.g., a silane coupling agent), and a metal oxide-based cross-linking agent. The number of kinds of the cross-linking agents may be only one, or two or more. The cross-linking agent preferably contains at least an oxazoline-based cross-linking agent.

When the acrylic resin composition contains the cross-linking agent, the content (solid content (nonvolatile content)) of the cross-linking agent is preferably more than 0 parts by weight and 10 parts by weight or less, more preferably from 0.01 part by weight to 9 parts by weight with respect to 100 parts by weight of the solid content (nonvolatile content) of the acrylic polymer.

The acrylic resin composition may contain any appropriate thickener in order to improve the stability of formed cells and film formability to the extent that the effect of the present invention is not impaired. Examples of the thickener include an acrylic acid-based thickener, a urethane-based thickener, and a polyvinyl alcohol-based thickener. The thickener is preferably a polyacrylic acid-based thickener or a urethane-based thickener.

When the acrylic resin composition contains the thickener, the content (solid content (nonvolatile content)) of the thickener is preferably more than 0 parts by weight and 10 parts by weight or less, more preferably from 0.1 part by weight to 5 parts by weight with respect to 100 parts by weight of the solid content (nonvolatile content) of the acrylic polymer.

The acrylic resin composition may contain any appropriate rust inhibitor in order to prevent the corrosion of a metal member to be adjacent to the foam sheet to the extent that the effect of the present invention is not impaired. The number of kinds of the rust inhibitors may be only one, or two or more. The rust inhibitor is preferably an azole ring-containing compound. When the azole ring-containing compound is used, a property of preventing the corrosion of a metal and adhesiveness to an adherent can both be achieved at high levels.

The azole ring-containing compound only needs to be a compound having a five-membered ring containing one or more nitrogen atoms in the ring, and examples thereof include a compound having a diazole (imidazole or pyrazole) ring, a compound having a triazole ring, a compound having a tetrazole ring, a compound having an oxazole ring, a compound having an isoxazole ring, a compound having a triazole ring, and a compound having an isothiazole ring. Any such ring may be fused with an aromatic ring, such as a benzene ring, to form a fused ring. Examples of the compound having such fused ring include a compound having a benzimidazole ring, a compound having a benzopyrazole ring, a compound having a benzotriazole ring, a compound having a benzoxazole ring, a compound having a benzisoxazole ring, a compound having a benzothiazole ring, and a compound having a benzisothiazole ring.

The azole ring and the fused ring (e.g., the benzotriazole ring or the benzothiazole ring) may each have a substituent. Examples of the substituent include: alkyl groups each having 1 to 6 carbon atoms (preferably 1 to 3 carbon atoms), such as a methyl group, an ethyl group, a propyl group, an isopropyl group, and a butyl group; alkoxy groups each having 1 to 12 carbon atoms (preferably 1 to 3 carbon atoms), such as a methoxy group, an ethoxy group, an isopropyloxy group, and a butoxy group; aryl groups each having 6 to 10 carbon atoms, such as a phenyl group, a tolyl group, and a naphthyl group; an amino group; (mono or di) C1-C10 alkylamino groups, such as a methylamino group and a dimethylamino group; amino-C1-C6 alkyl groups, such as an aminomethyl group and a 2-aminoethyl group; mono or di (C1-C10 alkyl)amino-C1-C6 alkyl groups, such as an N,N-diethylaminomethyl group and an N,N-bis(2-ethylhexyl)aminomethyl group; a mercapto group; alkoxycarbonyl groups each having 1 to 6 carbon atoms, such as a methoxycarbonyl group and an ethoxycarbonyl group; a carboxyl group; carboxy-C1-C6 alkyl groups, such as a carboxymethyl group; carboxy-C1-C6 alkylthio groups, such as a 2-carboxyethylthio group; N,N-bis(hydroxy-C1-C4 alkyl)amino-C1-C4 alkyl groups, such as an N,N-bis (hydroxymethyl)aminomethyl group; and a sulfo group. The azole ring-containing compound may form a salt, such as a sodium salt or a potassium salt.

From the standpoint of having a high rust-inhibiting action on a metal, the rust inhibitor is preferably a compound in which an azole ring forms a fused ring with an aromatic ring, such as a benzene ring, more preferably a benzotriazole-based compound (compound having a benzotriazole ring) or a benzothiazole-based compound (compound having a benzothiazole ring).

Examples of the benzotriazole-based compound include 1,2,3-benzotriazole, methylbenzotriazole, carboxybenzotriazole, carboxymethylbenzotriazole, 1-[N,N-bis(2-ethylhexyl)aminomethyl]benzotriazole, 1-[N,N-bis(2-ethylhexyl)aminomethyl]methylbenzotriazole, and 2,2′-[[(methyl-1H-benzotriazol-1-yl)methyl]imino]bisethanol, or sodium salts thereof.

Examples of the benzothiazole-based compound include 2-mercaptobenzothiazole and 3-(2-(benzothiazolyl)thio) propionic acid, or sodium salts thereof.

The number of kinds of the azole ring-containing compounds may be only one, or two or more.

When the acrylic resin composition contains the rust inhibitor, the addition amount (solid content (nonvolatile content)) of the rust inhibitor (e.g., the azole ring-containing compound) (solid content (nonvolatile content)) is preferably from 0.2 part by weight to 5 parts by weight, more preferably from 0.3 part by weight to 3 parts by weight, still more preferably from 0.4 part by weight to 2 parts by weight with respect to 100 parts by weight of the solid content (nonvolatile content) of the acrylic polymer.

The acrylic resin composition may have added thereto a silicone-based compound in order to improve the thickness recoverability and recovery rate of the foam sheet after compression. In addition, for a similar purpose, a silicone-modified polymer (e.g., a silicone-modified acrylic polymer or a silicone-modified urethane-based polymer) may be used in combination with the acrylic polymer. The number of kinds of the silicone-based compounds and the silicone-modified polymers may be only one, or two or more.

The silicone-based compound is preferably a silicone-based compound having 2,000 or less siloxane bonds. Examples of the silicone-based compound include a silicone oil, a modified silicone oil, and a silicone resin.

Examples of the silicone oil (straight silicone oil) include dimethyl silicone oil and methylphenyl silicone oil.

Examples of the modified silicone oil include a polyether-modified silicone oil (e.g., polyether-modified dimethyl silicone oil), an alkyl-modified silicone oil (e.g., an alkyl-modified dimethyl silicone oil), an aralkyl-modified silicone oil (e.g., an aralkyl-modified dimethyl silicone oil), a higher fatty acid ester-modified silicone oil (e.g., higher fatty acid ester-modified dimethyl silicone oil), and a fluoroalkyl-modified silicone oil (e.g., fluoroalkyl-modified dimethyl silicone oil).

Of the modified silicone oils, a polyether-modified silicone oil is preferred. A commercially available product of the polyether-modified silicone oil is, for example: a linear type silicone oil, such as "PEG-11 Methyl Ether Dimethicone", "PEG/PPG-20/22 Butyl Ether Dimethicone", "PEG-9 Methyl Ether Dimethicone", "PEG-32 Methyl Ether Dimethicone", "PEG-9 Dimethicone", "PEG-3 Dimethicone", or "PEG-10 Dimethicone" (manufactured by Shin-Etsu Chemical Co., Ltd.); or a branched type silicone oil, such as "PEG-9 Polydimethylsiloxyethyl Dimethicone" or "Lauryl PEG-9 Polydimethylsiloxyethyl Dimethicone" (manufactured by Shin-Etsu Chemical Co., Ltd.).

Examples of the silicone resin include a straight silicone resin and a modified silicone resin. Examples of the straight silicone resin include a methyl silicone resin and a methylphenyl silicone resin. Examples of the modified silicone resin include an alkyd-modified silicone resin, an epoxy-modified silicone resin, an acryl-modified silicone resin, and a polyester-modified silicone resin.

The total content ratio of the silicone-based compound and a silicone chain moiety present in the silicone-modified polymer in the acrylic resin composition is preferably from 0.01 part by weight to 5 parts by weight, more preferably from 0.05 part by weight to 4 parts by weight, still more preferably from 0.1 part by weight to 3 parts by weight with respect to 100 parts by weight of the solid content (nonvolatile content) of the acrylic polymer. When the total content ratio of the silicone-based compound and the silicone chain moiety present in the silicone-modified polymer in the acrylic resin composition falls within the above-mentioned ranges, the recoverability and recovery rate after compression can be improved without impairing characteristics as a foam sheet.

Examples of the other component that may be incorporated in the acrylic resin composition to the extent that the effect of the present invention is not impaired include another polymer component, a softening agent, an antioxidant, an age resistor, a gelling agent, a curing agent, a plasticizer, a filler, a reinforcing agent, a foaming agent, a flame retardant, a light stabilizer, a UV absorber, a colorant (e.g., a pigment or a dye), a pH adjustor, a solvent (an organic solvent), a thermal polymerization initiator, and a photopolymerization initiator.

Examples of the filler include silica, clays (e.g., mica, talc, and smectite), alumina, titania, zinc oxide, tin oxide, zeolite, graphite, carbon nanotubes, inorganic fibers (e.g., carbon fibers and glass fibers), organic fibers, metal powders (e.g., silver and copper), piezoelectric particles (e.g., titanium oxide), conductive particles, heat conductive particles (e.g., boron nitride), and organic fillers (e.g., silicone powder).

<Resin Composition Containing Silicone-Based Polymer (Silicone-Based Resin Composition)>

Any appropriate silicone-based polymer may be adopted as the silicone-based polymer to the extent that the effect of the present invention is not impaired.

Any appropriate content ratio may be adopted as the content ratio of the silicone-based polymer in the silicone-based resin composition to the extent that the effect of the present invention is not impaired. The content ratio of the silicone-based polymer in the silicone-based resin composition is preferably from 30 wt % to 100 wt %, more preferably from 50 wt % to 100 wt %, still more preferably from 70 wt % to 100 wt %, particularly preferably from 90 wt % to 100 wt % in terms of solid content.

The silicone-based resin composition may contain any appropriate other component in addition to the silicone-based polymer to the extent that the effect of the present invention is not impaired. Examples of such other component include a surfactant, a cross-linking agent, a thickener, a rust inhibitor, a silicone-based compound, another polymer component, a softening agent, an antioxidant, an age resistor, a gelling agent, a curing agent, a plasticizer, a filler, a reinforcing agent, a foaming agent, a flame retardant, a light stabilizer, a UV absorber, a colorant (e.g., a pigment or a dye), a pH adjustor, a solvent (an organic solvent), a thermal polymerization initiator, and a photopolymerization initiator. The number of kinds of the other components may be only one, or two or more.

<Resin Composition Containing Urethane-Based Polymer (Urethane-Based Resin Composition)>

Examples of the urethane-based polymer include polycarbonate-based polyurethane, polyester-based polyurethane, and polyether-based polyurethane.

Any appropriate content ratio may be adopted as the content ratio of the urethane-based polymer in the urethane-based resin composition to the extent that the effect of the present invention is not impaired. The content ratio of the urethane-based polymer in the urethane-based resin composition is preferably from 30 wt % to 100 wt %, more preferably from 50 wt % to 100 wt %, still more preferably from 70 wt % to 100 wt %, particularly preferably from 90 wt % to 100 wt % in terms of solid content.

The urethane-based resin composition may contain any appropriate other component in addition to the urethane-based polymer to the extent that the effect of the present invention is not impaired. Examples of such other component include a surfactant, a cross-linking agent, a thickener, a rust inhibitor, a silicone-based compound, another polymer component, a softening agent, an antioxidant, an age resistor, a gelling agent, a curing agent, a plasticizer, a filler, a reinforcing agent, a foaming agent, a flame retardant, a light stabilizer, a UV absorber, a colorant (e.g., a pigment or a dye), a pH adjustor, a solvent (an organic solvent), a thermal polymerization initiator, and a photopolymerization initiator. The number of kinds of the other components may be only one, or two or more.

<Resin Composition Containing Olefin-Based Polymer (Olefin-Based Resin Composition)>

An example of the olefin-based resin composition is a polyolefin-based resin composition essentially containing a polyolefin-based resin (component A). The polyolefin-based resin composition may contain a rubber and/or a thermoplastic elastomer (component B). The rubber and/or the thermoplastic elastomer (component B) preferably has a glass transition temperature equal to or lower than room temperature (e.g., 20° C. or less), and hence can improve the flexibility and shape followability of the foam layer.

The content ratio of the polyolefin-based resin (component A) in the polyolefin-based resin composition is preferably 10 wt % or more, more preferably 20 wt % or more, still more preferably 30 wt % or more, particularly preferably 40 wt % or more, most preferably 50 wt % or more.

When the polyolefin-based resin composition contains the rubber and/or the thermoplastic elastomer (component B), the content of the polyolefin-based resin (component A) in the polyolefin-based resin composition is preferably from 10 parts by weight to 200 parts by weight, more preferably from 20 parts by weight to 100 parts by weight with respect to 100 parts by weight of the rubber and/or the thermoplastic elastomer (component B).

Examples of the polyolefin-based resin (component A) include an α-olefin-based crystalline thermoplastic resin and an α-olefin-based amorphous thermoplastic resin. The number of kinds of the polyolefin-based resins (component A) may be only one, or two or more. In addition, the number of kinds of the components may be only one, or two or more.

Any appropriate α-olefin-based crystalline thermoplastic resin may be adopted as the α-olefin-based crystalline thermoplastic resin as long as the crystalline resin is formed from monomer components including an α-olefin as a main component to the extent that the effect of the present invention is not impaired. Such α-olefin-based crystalline thermoplastic resin may be a homopolymer of the α-olefin, or may be a copolymer of the α-olefin and another monomer. In addition, a mixture of two or more different kinds of those polymers and/or copolymers may be used.

The content ratio of the α-olefin in all monomer components forming the α-olefin-based crystalline thermoplastic resin is preferably 80 mol % or more, more preferably 90 mol % or more. Examples of such α-olefin include α-olefins each having 2 to 12 carbon atoms, such as ethylene, propene (propylene), 1-butene, 1-pentene, 3-methyl-1-butene, 1-hexene, 3-methyl-1-pentene, 4-methyl-1-pentene, 3-ethyl-1-pentene, 1-octene, 1-decene, and 1-undecene. The number of kinds of such α-olefins may be only one, or two or more.

When the α-olefin-based crystalline thermoplastic resin is a copolymer, the copolymer may be any of a random copolymer and a block copolymer. However, in order to have crystallinity, in the case of the random copolymer, the total content ratio of constituent units excluding the α-olefin is preferably 15 mol % or less, more preferably 10 mol % or less with respect to 100 mol % of the whole random copolymer. In addition, in the case of the block copolymer, the total content ratio of constituent units excluding the α-olefin is preferably 40 mol % or less, more preferably 20 mol % or less with respect to 100 mol % of the block copolymer.

Any appropriate α-olefin-based amorphous thermoplastic resin may be adopted as the α-olefin-based amorphous thermoplastic resin as long as the resin is a noncrystalline resin formed from monomer components including an α-olefin as a main component to the extent that the effect of the present invention is not impaired. Such α-olefin-based amorphous thermoplastic resin may be a homopolymer of the α-olefin, or may be a copolymer of the α-olefin and another monomer. In addition, a mixture of two or more different kinds of those polymers and/or copolymers may be used.

The content ratio of the α-olefin in all monomer components forming the α-olefin-based amorphous thermoplastic resin is preferably 50 mol % or more, more preferably 60 mol % or more. Such α-olefin is preferably an α-olefin having 3 or more carbon atoms, and is more preferably an α-olefin having 3 to 12 carbon atoms similar to some of those given as examples for the α-olefin-based crystalline thermoplastic resin.

Examples of the α-olefin-based amorphous thermoplastic resin include: a homopolymer, such as atactic polypropylene or atactic poly-1-butene; a copolymer of propylene (content: 50 mol % or more) and another α-olefin (e.g., ethylene, 1-butene, 1-pentene, 1-hexene, 4-methyl-1-pentene, 1-octene, or 1-decene); and a copolymer of 1-butene (content: 50 mol % or more) and another α-olefin (ethylene, propylene, 1-pentene, 1-hexene, 4-methyl-1-pentene, 1-octene, or 1-decene). The copolymer may be any of a random copolymer and a block copolymer. However, in the case of the block copolymer, α-olefin units each serving as a main component (e.g., propylene or 1-butene in each of the above-mentioned copolymers) are preferably bonded in an atactic structure. In addition, when the α-olefin-based amorphous thermoplastic resin is a copolymer of an α-olefin having 3 or more carbon atoms and ethylene, the content ratio of the α-olefin is preferably 50 mol % or more, more preferably from 60 mol % to 100 mol % with respect to 100 mol % of the whole copolymer.

Any appropriate rubber and/or thermoplastic elastomer may be adopted as the rubber and/or the thermoplastic elastomer (component B) to the extent that the effect of the present invention is not impaired. Examples of the rubber include natural or synthetic rubbers, such as a natural rubber, polyisobutylene, an isoprene rubber, a chloroprene rubber, a butyl rubber, and a nitrile butyl rubber. Examples of the thermoplastic elastomer include: olefin-based elastomers, such as an ethylene-propylene copolymer, an ethylene-propylene-diene copolymer, an ethylene-vinyl acetate copolymer, polybutene, polyisobutylene, and chlorinated polyethylene; styrene-based elastomers, such as a styrene-butadiene-styrene copolymer, a styrene-isoprene-styrene copolymer, a styrene-isoprene-butadiene-styrene copolymer, and hydrogenated polymers thereof; thermoplastic polyester-based elastomers; thermoplastic polyurethane-based elastomers; and thermoplastic acrylic elastomers. The number of kinds of those rubbers and thermoplastic elastomers may be only one, or two or more. In addition, the number of kinds of the components may be only one, or two or more.

A preferred example of the rubber and/or the thermoplastic elastomer (component B) is a thermoplastic olefin-based elastomer. The thermoplastic olefin-based elastomer is an elastomer having a structure in which an olefin component and an olefin-based rubber component are microphase-separated, and has satisfactory compatibility with the polyolefin-based resin. A specific example of the thermoplastic olefin-based elastomer is an elastomer having a structure in which a polypropylene resin (PP), and an ethylene-propylene rubber (EPM) and/or an ethylene-propylene-diene rubber (EPDM) are microphase-separated. The weight ratio of the olefin component to the olefin-based rubber component, "olefin component/olefin-based rubber component," is preferably from 90/10 to 10/90, more preferably from 80/20 to 20/80 from the viewpoint of compatibility.

The thermoplastic olefin-based elastomer is preferably a non-cross-linked thermoplastic olefin-based elastomer from the viewpoint of cost or the like.

The rubber and/or the thermoplastic elastomer (component B) may contain a softening agent. The incorporation of the softening agent can improve processability and flexibility. A softening agent to be generally used for a rubber product may be suitably used as the softening agent.

Specific examples of the softening agent include: petroleum-based substances, such as process oil, lubricating oil, paraffin, liquid paraffin, petroleum asphalt, and Vaseline; coal tars, such as coal tar and coal-tar pitch; fatty oils, such as castor oil, linseed oil, rapeseed oil, soybean oil, and palm oil; waxes, such as tall oil, beeswax, carnauba wax, and lanolin; synthetic polymer substances, such as a petroleum resin, a coumarone indene resin, and atactic polypropylene; ester compounds, such as dioctyl phthalate, dioctyl adipate, and dioctyl sebacate; microcrystalline wax; factice; liquid polybutadiene; modified liquid polybutadiene; liquid thiokol; liquid polyisoprene; liquid polybutene; and a liquid ethylene-α-olefin-based copolymer. Of those softening agents, mineral oils, such as a paraffin-based mineral oil, a naphthene-based mineral oil, and an aromatic mineral oil, liquid polyisoprene, liquid polybutene, and a liquid ethylene-α-olefin-based copolymer are preferred, and liquid polyisoprene, liquid polybutene, and a liquid ethylene-α-olefin-based copolymer are more preferred.

The content ratio of the softening agent is, for example, preferably from 0 parts by mass to 200 parts by mass, more preferably from 0 parts by mass to 100 parts by mass, still more preferably from 0 parts by mass to 50 parts by mass with respect to 100 parts by mass of the thermoplastic olefin-based elastomer in the rubber and/or the thermoplastic elastomer (component B).

The polyolefin-based resin composition may contain at least one aliphatic compound (component C) selected from a fatty acid, a fatty acid amide, and a fatty acid metal soap, having a polar functional group and having a melting point of from 50° C. to 150° C.

When the polyolefin-based resin composition contains the at least one aliphatic compound (component C) selected from a fatty acid, a fatty acid amide, and a fatty acid metal soap, having a polar functional group and having a melting point of from 50° C. to 150° C., the action of the component C allows, for example, excellent shape processability to be exhibited at the time of punching processing without using a dynamic cross-linking type thermoplastic elastomer. The dynamic cross-linking type thermoplastic elastomer is such that a rubber component has a cross-linked structure formed with a cross-linking agent, and the dynamic cross-linking type thermoplastic elastomer has a characteristic phase structure (morphology) that is a sea-island structure containing a thermoplastic resin as a sea (matrix) and particles of a cross-linked rubber component as islands (domains). The non-cross-linked thermoplastic olefin-based elastomer refers to a simple polymer blend using no cross-linking agent.

The at least one aliphatic compound (component C) selected from a fatty acid, a fatty acid amide, and a fatty acid metal soap, having a polar functional group and having a melting point of from 50° C. to 150° C., is an aliphatic compound having a polar functional group, such as a carboxyl group, a metal salt thereof, or an amide group, and having a melting point of from 50° C. to 150° C., and is specifically, for example, at least one selected from a fatty acid, a fatty acid amide, and a fatty acid metal soap. Of those, a compound containing a functional group having high polarity is hardly compatible with the polyolefin-based resin. Accordingly, such compound is easily precipitated on the surface of the resin, and allows the effect of the present invention to be easily exhibited. As such compound, a fatty acid and a fatty acid amide are preferred. The fatty acid amide is preferably a fatty acid amide containing a fatty acid having about 18 to about 38 (more preferably 18 to 22) carbon atoms, and may be a monoamide or a bisamide. Specific examples thereof include stearamide, oleamide, erucamide, methylene bisstearamide, and ethylene bisstearamide. Of those, erucamide is preferred. In addition, the fatty acid is preferably a fatty acid having about 18 to about 38 (more preferably 18 to 22) carbon atoms, and specific examples thereof include stearic acid, behenic acid, and 12-hydroxystearic acid. Of those, behenic acid is preferred. Examples of the fatty acid metal soap include salts of the above-mentioned fatty acids with aluminum, calcium, magnesium, lithium, barium, zinc, and lead.

The at least one aliphatic compound (component C) selected from a fatty acid, a fatty acid amide, and a fatty acid metal soap, having a polar functional group and having a melting point of from 50° C. to 150° C., has high crystallinity, and when added to the polyolefin-based resin, preferably forms a firm film on the surface of the resin. With this, when the foam sheet of the present invention or the foam layer included in the foam sheet is subjected to punching processing, the cells of the foam layer are less liable to be crushed, and hence shape recoverability can be improved, presumably because the component C serves to prevent blocking between the surfaces of resin walls forming the cells.

The content of the at least one aliphatic compound (component C) selected from a fatty acid, a fatty acid amide, and a fatty acid metal soap, having a polar functional group and having a melting point of from 50° C. to 150° C. is, for example, preferably from 1 part by weight to 5 parts by weight, more preferably from 1.5 parts by weight to 3.5 parts by weight, still more preferably from 2 parts by weight to 3 parts by weight with respect to 100 parts by weight of the total amount of the component A and the component B.

The melting point of the at least one aliphatic compound (component C) selected from a fatty acid, a fatty acid amide, and a fatty acid metal soap, having a polar functional group and having a melting point of from 50° C. to 150° C., is preferably from 50° C. to 150° C., more preferably from 70° C. to 100° C. from the viewpoints of, for example, lowering the forming temperature, suppressing the deterioration of the polyolefin-based resin composition, and imparting sublimation resistance.

<Resin Composition Containing Ester-Based Polymer (Ester-Based Resin Composition)>

Any appropriate ester-based polymer may be adopted as the ester-based polymer to the extent that the effect of the present invention is not impaired. Such ester-based polymer is preferably a resin having an ester bond site resulting from a reaction (polycondensation) between a polyol component and a polycarboxylic acid component.

Preferred examples of the ester-based polymer include a polyester-based thermoplastic resin and a polyester-based thermoplastic elastomer. The number of kinds of those polymers may be only one, or two or more.

Examples of the polyester-based thermoplastic resin include polyalkylene terephthalate-based resins, such as polyethylene terephthalate, polytrimethylene terephthalate, polybutylene terephthalate, polyethylene naphthalate, polybutylene naphthalate, and polycyclohexane terephthalate. When the polyalkylene terephthalate-based resin is a copolymer, the copolymer may have the form of any of a random copolymer, a block copolymer, and a graft copolymer. The number of kinds of the polyester-based thermoplastic resins may be only one, or two or more.

An example of the polyester-based thermoplastic elastomer is a polyester-based thermoplastic elastomer obtained by condensation polymerization between an aromatic dicarboxylic acid (divalent aromatic carboxylic acid) and a diol component. The number of kinds of the polyester-based thermoplastic elastomers may be only one, or two or more.

Examples of the aromatic dicarboxylic acid include terephthalic acid, isophthalic acid, phthalic acid, a naphthalenecarboxylic acid (e.g., 2,6-naphthalenedicarboxylic acid or 1,4-naphthalenedicarboxylic acid), diphenyl ether dicarboxylic acid, and 4,4'-biphenyldicarboxylic acid. The number of kinds of the aromatic dicarboxylic acids may be only one, or two or more.

Examples of the diol component include: aliphatic diols, such as ethylene glycol, propylene glycol, trimethylene glycol, 1,4-butanediol (tetramethylene glycol), 2-methyl-1,3-propanediol, 1,5-pentanediol, 2,2-dimethyl-1,3-propanediol (neopentyl glycol), 1,6-hexanediol, 3-methyl-1,5-pentanediol, 2-methyl-2,4-pentanediol, 1,7-heptanediol, 2,2-diethyl-1,3-propanediol, 2-methyl-2-propyl-1,3-propanediol, 2-methyl-1,6-hexanediol, 1,8-octanediol, 2-butyl-2-ethyl-1,3-propanediol, 1,3,5-trimethyl-1,3-pentanediol, 1,9-nonanediol, 2,4-diethyl-1,5-pentanediol, 2-methyl-1,8-octanediol, 1,10-decanediol, 2-methyl-1,9-nonanediol, 1,18-octadecanediol, and a dimer diol; alicyclic diols, such as 1,4-cyclohexanediol, 1,3-cyclohexanediol, 1,2-cyclohexanediol, 1,4-cyclohexanedimethanol, 1,3-cyclohexanedimethanol, and 1,2-cyclohexanedimethanol; aromatic diols, such as bisphenol A, an ethylene oxide adduct of bisphenol A, bisphenol S, an ethylene oxide adduct of bisphenol S, xylylenediol, and naphthalenediol; and ether glycols, such as diethylene glycol, triethylene glycol, tetraethylene glycol, polyethylene glycol, and dipropylene glycol. The diol component may be a diol component in a polymer form, such as a polyether diol or a polyester diol. Examples of the polyether diol include polyether diols, such as polyethylene glycol, polypropylene glycol, and polytetramethylene glycol each obtained by subjecting, for example, ethylene oxide, propylene oxide, or tetrahydrofuran to ring-opening polymerization, and copolyethers each obtained by copolymerizing those compounds. The number of kinds of the diol components may be only one, or two or more.

The polyester-based thermoplastic elastomer is preferably a polyester-based thermoplastic elastomer that is a block copolymer of a hard segment and a soft segment. When such polyester-based thermoplastic elastomer that is a block copolymer of a hard segment and a soft segment is adopted, the modulus of elasticity can be improved, and besides, flexibility can be increased.

Examples of the polyester-based thermoplastic elastomer that is a block copolymer of a hard segment and a soft segment include the following copolymers (i) to (iii).

(i) A polyester-polyester type copolymer containing, as a hard segment, polyester formed by polycondensation between an aromatic dicarboxylic acid and, among diol components, a diol component having 2 to 4 carbon atoms in a main chain between hydroxyl groups, and containing, as a soft segment, polyester formed by polycondensation between an aromatic dicarboxylic acid and, among diol components, a diol component having 5 or more carbon atoms in a main chain between hydroxyl groups.

(ii) A polyester-polyether type copolymer containing polyester similar to that of the item (i) as a hard segment, and containing polyether, such as polyether diol or aliphatic polyether, as a soft segment.

(iii) A polyester-polyester type copolymer containing polyester similar to those of the items (i) and (ii) as a hard segment, and containing aliphatic polyester as a soft segment.

The polyester-based thermoplastic elastomer is preferably a polyester-based elastomer that is a block copolymer of a hard segment and a soft segment, more preferably the polyester-polyether type copolymer (ii) described above (polyester-polyether type copolymer containing, as a hard segment, polyester formed by polycondensation between an aromatic dicarboxylic acid and a diol component having 2 to 4 carbon atoms in a main chain between hydroxyl groups, and containing polyether as a soft segment).

A more specific example of the polyester-polyether type copolymer (ii) described above is a polyester-polyether type block copolymer containing polybutylene terephthalate as a hard segment and polyether as a soft segment.

The melt flow rate (MFR) of the ester-based polymer at 230° C. is preferably from 1.5 g/10 min to 4.0 g/10 min.

Any appropriate content ratio may be adopted as the content ratio of the ester-based polymer in the ester-based resin composition to the extent that the effect of the present invention is not impaired. The content ratio of the ester-based polymer in the ester-based resin composition is preferably from 30 wt % to 100 wt %, more preferably from 50 wt % to 100 wt %, still more preferably from 70 wt % to 100 wt %, particularly preferably from 90 wt % to 100 wt % in terms of solid content.

The ester-based resin composition may contain any other resin (resin other than the ester-based polymer). The number of kinds of the other resins may be only one, or two or more.

Examples of the other resin include: polyolefin-based resins, such as low-density polyethylene, medium-density polyethylene, high-density polyethylene, linear low-density polyethylene, polypropylene, a copolymer of ethylene and propylene, a copolymer of ethylene or propylene and another α-olefin (e.g., butene-1, pentene-1, hexene-1, or 4-methyl pentene-1), and a copolymer of ethylene and another ethylenically unsaturated monomer (e.g., vinyl acetate, acrylic acid, acrylic acid ester, methacrylic acid, a methacrylic acid ester, or vinyl alcohol); styrene-based resins, such as polystyrene and an acrylonitrile-butadiene-styrene copolymer (ABS resin); polyamide-based resins, such as 6-nylon, 66-nylon, and 12-nylon; polyamide-imide; polyurethane; polyimide; polyetherimide; acrylic resins, such as polymethyl methacrylate; polyvinyl chloride; polyvinyl fluoride; alkenyl aromatic resins; polycarbonate, such as bisphenol A-based polycarbonate; polyacetal; and polyphenylene sulfide. When those resins are copolymers, the resins may each be a copolymer in any form of a random copolymer or a block copolymer.

The ester-based resin composition preferably contains a foam nucleating agent. When the ester-based resin composition contains the foam nucleating agent, a satisfactory foamed state is easily obtained. The number of kinds of the foam nucleating agents may be only one, or two or more.

Any appropriate foam nucleating agent may be adopted as the foam nucleating agent to the extent that the effect of the present invention is not impaired. An example of such foam nucleating agent is an inorganic substance. Examples of the inorganic substance include: hydroxides, such as aluminum hydroxide, potassium hydroxide, calcium hydroxide, and magnesium hydroxide; clays (particularly hard clay); talc; silica; zeolite; alkaline earth metal carbonic acid salts, such as calcium carbonate and magnesium carbonate; metal oxides, such as zinc oxide, titanium oxide, and alumina; metal powders, such as various metal powders, such as iron powder, copper powder, aluminum powder, nickel powder, zinc powder, and titanium powder, and alloy powders; mica; carbon particles; a glass fiber; a carbon tube; a layered silicate; and glass. The inorganic substance is preferably a clay or an alkaline earth metal carbonic acid salt, more preferably hard clay, because the occurrence of a coarse cell can be suppressed to facilitate the obtainment of a uniform and fine cell structure.

The hard clay is a clay hardly containing coarse particles. The hard clay is preferably a clay having a 166-mesh sieve residue of 0.01% or less, more preferably a clay having a 166-mesh sieve residue of 0.001% or less. The sieve residue is the ratio (on a weight basis) of what remains on a sieve without passing therethrough to the whole clay when sieving is performed with the sieve.

The hard clay contains aluminum oxide and silicon oxide as essential components. The total ratio of aluminum oxide and silicon oxide in the hard clay is preferably 80 wt % or more (e.g., from 80 wt % to 100 wt %), more preferably 90 wt % or more (e.g., from 90 wt % to 100 wt %) with respect to the total amount (100 wt %) of the hard clay. The hard clay may be fired.

The average particle diameter (average particle size) of the hard clay is preferably from 0.1 μm to 10 μm, more preferably from 0.2 μm to 5.0 μm, still more preferably from 0.5 μm to 1.0 μm.

The inorganic substance is preferably subjected to surface treatment. As a surface treatment agent to be used for the surface treatment of the inorganic substance, for improving affinity for the ester-based resin through the surface treatment to provide an effect such as the prevention of the occurrence of a void at the time of, for example, foaming, forming, kneading, or stretching, or the prevention of the rupture of cells at the time of foaming, there are given an aluminum-based compound, a silane-based compound, a titanate-based compound, an epoxy-based compound, an isocyanate-based compound, a higher fatty acid or a salt thereof, and a phosphoric acid ester, and of those, a silane-based compound (in particular, a silane coupling agent), or a higher fatty acid or a salt thereof (in particular, stearic acid) is preferred. The number of kinds of the surface treatment agents may be only one, or two or more. The surface treatment is preferably silane coupling treatment, or treatment with a higher fatty acid or a salt thereof.

The aluminum-based compound is preferably an aluminum-based coupling agent. Examples of the aluminum-based coupling agent include an acetoalkoxyaluminum diisopropylate, aluminum ethylate, aluminum isopropylate, mono-sec-butoxyaluminum diisopropylate, aluminum sec-butyrate, aluminum ethylacetoacetate diisopropylate, aluminum tris(ethylacetoacetate), aluminum monoacetylacetonate bis(ethylacetoacetate), aluminum tris(acetylacetonate), cyclic aluminum oxide isopropylate, and cyclic aluminum oxide isostearate.

The silane-based compound is preferably a silane-based coupling agent. Examples of the silane-based coupling agent include a vinyl group-containing silane-based coupling agent, a (meth)acryloyl group-containing silane-based coupling agent, an amino group-containing silane-based coupling agent, an epoxy group-containing silane-based coupling agent, a mercapto group-containing silane-based coupling agent, a carboxyl group-containing silane-based coupling agent, and a halogen atom-containing silane-based coupling agent. Specific examples of the silane-based coupling agent include vinyltrimethoxysilane, vinylethoxysilane, dimethylvinylmethoxysilane, dimethylvinylethoxysilane, methylvinyldimethoxysilane, methylvinyldiethoxysilane, vinyl-tris(2-methoxy)silane, vinyltriacetoxysilane, 2-methacryloxyethyltriethoxysilane, 3-methacryloxypropyltrimethoxysilane, 3-methacryloxypropyltriethoxysilane, 3-methacryloxy-propylmethyldimethoxysilane, 3-aminopropyltrimethoxysilane, 3-aminopropyltriethoxysilane, 2-aminoethyltrimethoxysilane, 3-[N-(2-aminoethyl)amino]propyltrimethoxysilane, 3-[N-(2-aminoethyl)amino]propyltriethoxysilane, 2-[N-(2-aminoethyl)amino]ethyltrimethoxysilane, 2-(3,4-epoxycyclohexyl) ethyltrimethoxysilane, 2-(3,4-epoxycyclohexyl)ethyltriethoxysilane, 3-glycidoxypropyltrimethoxysilane, 3-glycidoxypropylmethyldiethoxysilane, 2-glycidoxyethyltrimethoxysilane, 2-glycidoxy-ethyltriethoxysilane, 3-mercaptopropyltrimethoxysilane, carboxymethyltriethoxysilane, 3-carboxypropyltrimethoxysilane, and 3-carboxypropyltriethoxysilane.

The titanate-based compound is preferably a titanate-based coupling agent. Examples of the titanate-based coupling agent include isopropyl triisostearoyl titanate, isopropyltris(dioctylpyrophosphate) titanate, isopropyltri(N-aminoethyl-aminoethyl) titanate, isopropyltridecylbenzenesulfonyl titanate, tetraisopropylbis(dioctylphosphite) titanate, tetraoctylbis(ditridecylphosphite) titanate, tetra(2,2-diallyloxymethyl-1-butyl)bis(di-tridecyl)phosphite titanate, bis(dioctylpyrophosphate) oxyacetate titanate, bis(dioctylpyrophosphate)ethylene titanate, isopropyl trioctanoyl titanate, isopropyldimethacrylisostearoyl titanate, isopropylisostearoyldiacryl titanate, isopropyltri(dioctylphosphate) titanate, isopropyltricumylphenyl titanate, dicumylphenyloxyacetate titanate, and diisostearoylethylene titanate.

The epoxy compound is preferably an epoxy-based resin or a monoepoxy-based compound. Examples of the epoxy-based resin include a glycidyl ether-type epoxy resin, such as a bisphenol A-type epoxy-based resin, a glycidyl ester-type epoxy resin, a glycidyl amine-type epoxy resin, and an alicyclic epoxy resin. Examples of the monoepoxy-based compound include styrene oxide, glycidyl phenyl ether, allyl glycidyl ether, glycidyl (meth)acrylate, 1,2-epoxycyclohexane, epichlorohydrin, and glycidol.

The isocyanate-based compound is preferably a polyisocyanate-based compound or a monoisocyanate-based compound. Examples of the polyisocyanate-based compound include: aliphatic diisocyanates, such as tetramethylene diisocyanate and hexamethylene diisocyanate; alicyclic diisocyanates, such as isophorone diisocyanate and 4,4'-dicyclohexylmethane diisocyanate; aromatic diisocyanates, such as diphenylmethane diisocyanate, 2,4-tolylene diisocyanate, 2,6-tolylene diisocyanate, phenylene diisocyanate, 1,5-naphthylene diisocyanate, xylylene diisocyanate, and toluylene diisocyanate; and polymers each having a free isocyanate group formed by a reaction of any of those diisocyanate compounds and a polyol compound. Examples of the monoisocyanate-based compound include phenyl isocyanate and stearyl isocyanate.

Examples of the higher fatty acid or the salt thereof include: higher fatty acids, such as oleic acid, stearic acid, palmitic acid, and lauric acid; and salts (e.g., metal salts) of the higher fatty acids. A metal atom in the metal salt of the higher fatty acid is, for example: an alkali metal atom, such as a sodium atom or a potassium atom; or an alkaline earth metal atom, such as a magnesium atom or a calcium atom.

An example of the phosphoric acid ester is a phosphoric acid partial ester. Examples of the phosphoric acid partial ester include a phosphoric acid partial ester obtained by partially esterifying (mono or diesterifying) a phosphoric acid (e.g., orthophosphoric acid) with an alcohol component (e.g., stearyl alcohol), and a phosphoric acid partial ester salt (e.g., a metal salt obtained with an alkali metal).

As a method for the surface treatment of the inorganic substance with the surface treatment agent, there are given, for example, a dry method, a wet method, and an integral blending method. In addition, the amount of the surface treatment agent in the surface treatment of the inorganic substance with the surface treatment agent is preferably from 0.1 part by weight to 10 parts by weight, more preferably from 0.3 part by weight to 8 parts by weight with respect to 100 parts by weight of the inorganic substance.

The 166-mesh sieve residue of the inorganic substance is preferably 0.01% or less, more preferably 0.001% or less. This is because, when coarse particles are present in the foaming of the ester-based resin composition, the rupture of cells becomes liable to occur. This is due to the sizes of the particles exceeding the thicknesses of cell walls.

The average particle diameter (average particle size) of the inorganic substance is preferably from 0.1 μm to 10 μm, more preferably from 0.2 μm to 5.0 μm, still more preferably from 0.5 μm to 1.0 μm. When the average particle diameter (average particle size) of the inorganic substance is less than 0.1 μm, the inorganic substance does not sufficiently function as the nucleating agent in some cases. When the average particle diameter (average particle size) of the inorganic substance is more than 10 μm, gas escape is caused at the time of the foaming of the ester-based resin composition in some cases.

The foam nucleating agent is preferably an inorganic substance subjected to surface treatment (in particular, hard clay subjected to surface treatment) because the affinity for the ester-based resin is improved and the rupture of cells at the time of foaming due to the occurrence of voids at an interface between the ester-based resin and the inorganic substance can be suppressed to facilitate the obtainment of a fine cell structure.

The content ratio of the foam nucleating agent in the ester-based resin composition is preferably from 0.1 wt % to 20 wt %, more preferably from 0.3 wt % to 10 wt %, still more preferably from 0.5 wt % to 6 wt % with respect to the total amount (100 wt %) of the ester-based resin composition. When the content ratio of the foam nucleating agent in the ester-based resin composition is 0.1 wt % or more, sites for forming cells (cell formation sites) can be sufficiently secured, with the result that a fine cell structure is easily obtained. When the content ratio of the foam nucleating agent in the ester-based resin composition is 20 wt % or less, a remarkable increase in viscosity of the ester-based resin composition can be suppressed, and gas escape at the time of the foaming of the ester-based resin composition can be suppressed, with the result that a uniform cell structure is easily obtained.

The ester-based resin composition may contain a modified polymer. The modified polymer is preferably an epoxy-modified polymer. The epoxy-modified polymer can act as a cross-linking agent and as a modifier (resin modifier) for improving the melt tension and degree of strain hardening of the ester-based resin composition. Accordingly, when the ester-based resin composition contains the epoxy-modified polymer, a stress retention ratio equal to or higher than a predetermined value is obtained, and hence excellent deformation recovery performance is easily obtained, and in addition, a highly foamed and fine cell structure is easily obtained. The number of kinds of the modified polymers, such as the epoxy-modified polymers, may be only one, or two or more.

The epoxy-modified polymer is preferably at least one kind of polymer selected from: an epoxy-modified acrylic polymer, which is a polymer having an epoxy group at an end of the main chain of an acrylic polymer or in a side chain thereof; and an epoxy-modified polyethylene, which is a polymer having an epoxy group at an end of the main chain of polyethylene or in a side chain thereof, because such polymer is less liable to form a three-dimensional network structure as compared to a low-molecular-weight compound having an epoxy group, and can easily provide an ester-based resin composition excellent in melt tension and degree of strain hardening.

The weight-average molecular weight of the epoxy-modified polymer is preferably from 5,000 to 100,000, more preferably from 8,000 to 80,000, still more preferably from 10,000 to 70,000, particularly preferably from 20,000 to 60,000. When the weight-average molecular weight of the epoxy-modified polymer is less than 5,000, the reactivity of the epoxy-modified polymer increases, resulting in a risk in that a high degree of foaming cannot be achieved.

The epoxy equivalent of the epoxy-modified polymer is preferably from 100 g/eq to 3,000 g/eq, more preferably from 200 g/eq to 2,500 g/eq, still more preferably from 300 g/eq to 2,000 g/eq, particularly preferably from 800 g/eq to 1,600 g/eq. A case in which the epoxy equivalent of the epoxy-modified polymer is 3,000 g/eq or less is preferred because the melt tension and degree of strain hardening of the ester-based resin composition are sufficiently improved to provide a stress retention ratio equal to or higher than a predetermined value, and hence excellent deformation recovery performance is easily obtained, and in addition, a highly foamed and fine cell structure is easily obtained. A case in which the epoxy equivalent of the epoxy-modified polymer is 100 g/eq or more is preferred because an inconvenience in that the reactivity of the epoxy-modified polymer is increased to make the viscosity of the ester-based resin composition so high that a high degree of foaming cannot be achieved can be suppressed.

The viscosity (B-type viscosity, 25° C.) of the epoxy-modified polymer is preferably from 2,000 mPa·s to 4,000 mPa·s, more preferably from 2,500 mPa·s to 3,200 mPa·s. A case in which the viscosity of the epoxy-modified polymer is 2,000 mPa·s or more is preferred because the rupture of cell walls at the time of the foaming of the ester-based resin composition is suppressed, with the result that a highly foamed and fine cell structure is easily obtained. A case in which the viscosity of the epoxy-modified polymer is 4,000 mPa·s or less is preferred because the fluidity of the ester-based resin composition is easily obtained to enable efficient foaming.

The epoxy-modified polymer preferably has a weight-average molecular weight of from 5,000 to 100,000 and an epoxy equivalent of from 100 g/eq to 3,000 g/eq.

The content of the modified polymer in the ester-based resin composition is preferably from 0.5 part by weight to 15.0 parts by weight, more preferably from 0.6 part by weight to 10.0 parts by weight, still more preferably from 0.7 part by weight to 7.0 parts by weight, particularly preferably from 0.8 part by weight to 3.0 parts by weight with respect to 100 parts by weight of the ester-based polymer.

A case in which the content of the epoxy-modified polymer in the ester-based resin composition is 0.5 part by weight or more is preferred because the melt tension and degree of strain hardening of the ester-based resin composition can be increased to provide a stress retention ratio equal to or higher than a predetermined value, and hence excellent deformation recovery performance is easily obtained, and in addition, a highly foamed and fine cell structure is easily obtained. A case in which the content of the epoxy-modified polymer in the ester-based resin composition is 15.0 parts by weight or less is preferred because an inconvenience in that the viscosity of the ester-based resin composition becomes so high that a high degree of foaming cannot be achieved can be suppressed, with the result that a highly foamed and fine cell structure is easily obtained.

The epoxy-modified polymer can prevent polyester chains from being cleaved due to hydrolysis (e.g., hydrolysis due to the absorption of moisture by a raw material), pyrolysis, oxidative decomposition, or the like, and further, can bond cleaved polyester chains again, and hence can further improve the melt tension of the ester-based resin composition. The epoxy-modified polymer has many epoxy groups in one molecule thereof. Accordingly, the epoxy-modified polymer more easily forms a branched structure than a related-art epoxy-based cross-linking agent, and can further improve the degree of strain hardening of the ester-based resin composition.

The ester-based resin composition preferably contains a lubricant. A case in which the ester-based resin composition contains the lubricant is preferred because the formability of the ester-based resin composition is improved and its lubricity is improved, and hence, for example, the composition can be easily extruded into a desired shape from an extruder without clogging. The number of kinds of the lubricants may be only one, or two or more.

Examples of the lubricant include an aliphatic carboxylic acid and derivatives thereof (e.g., an aliphatic carboxylic acid anhydride, an alkali metal salt of an aliphatic carboxylic acid, and an alkaline earth metal salt of an aliphatic carboxylic acid). Examples of the aliphatic carboxylic acid and the derivatives thereof include fatty carboxylic acids each having 3 to 30 carbon atoms and derivatives thereof, such as lauric acid and derivatives thereof, stearic acid and derivatives thereof, crotonic acid and derivatives thereof, oleic acid and derivatives thereof, maleic acid and derivatives thereof, glutanic acid and derivatives thereof, behenic acid and derivatives thereof, and montanic acid and derivatives thereof.

Of the fatty carboxylic acids each having 3 to 30 carbon atoms and derivatives thereof, from the viewpoints of, for example, dispersibility and solubility in the ester-based resin composition, and a surface appearance-improving effect, stearic acid and derivatives thereof, and montanic acid and derivatives thereof are preferred, and alkali metal salts of stearic acid and alkaline earth metal salts of stearic acid are more preferred. Of the alkali metal salts of stearic acid and the alkaline earth metal salts of stearic acid, zinc stearate and calcium stearate are more preferred.

Examples of the lubricant also include an acrylic lubricant. As a commercially available product of the acrylic lubricant, there is given, for example, an acrylic polymer external lubricant (product name: "METABLEN L", manufactured by Mitsubishi Rayon Co., Ltd.).

The lubricant is preferably an acrylic lubricant.

The content of the lubricant in the ester-based resin composition is preferably from 0.1 part by weight to 20 parts by weight, more preferably from 0.3 part by weight to 10 parts by weight, still more preferably from 0.5 part by weight to 8 parts by weight with respect to 100 parts by weight of the ester-based resin. A case in which the content of the lubricant in the ester-based resin composition is 0.1 part by weight or more is preferred because the effect obtained by containing the lubricant is easily obtained. A case in which the content of the lubricant is 20 parts by weight or less is preferred because cell omission at the time of the foaming of the ester-based resin composition can be suppressed to suppress an inconvenience in that a high degree of foaming cannot be achieved.

The ester-based resin composition may contain any appropriate cross-linking agent to the extent that the effect of the present invention is not impaired. Examples of the cross-linking agent include an epoxy-based cross-linking agent, an isocyanate-based cross-linking agent, a silanol-based cross-linking agent, a melamine resin-based cross-linking agent, a metal salt-based cross-linking agent, a metal chelate-based cross-linking agent, and an amino resin-based cross-linking agent. The number of kinds of the cross-linking agents may be only one, or two or more.

The ester-based resin composition may contain any appropriate crystallization promoter to the extent that the effect of the present invention is not impaired. An example of the crystallization promoter is an olefin-based resin. Examples of such olefin-based resin include: a resin of a type having a wide molecular weight distribution with a shoulder on the high molecular weight side; a resin of a slightly cross-linked type (resin of a type cross-linked a little); and a resin of a long-chain branched type. Examples of the olefin-based resin include low-density polyethylene, medium-density polyethylene, high-density polyethylene, linear low-density polyethylene, polypropylene, a copolymer of ethylene and propylene, a copolymer of ethylene or propylene and another α-olefin (e.g., butene-1, pentene-1, hexene-1, or 4-methyl pentene-1), and a copolymer of ethylene and another ethylenically unsaturated monomer (e.g., vinyl acetate, acrylic acid, an acrylic acid ester, methacrylic acid, a methacrylic acid ester, or vinyl alcohol). When the olefin-based resin is a copolymer, the resin may be a copolymer in any form of a random copolymer and a block copolymer. In addition, the number of kinds of the olefin-based resins may be only one, or two or more.

The ester-based resin composition may contain any appropriate flame retardant to the extent that the effect of the present invention is not impaired. Examples of the flame retardant include powder particles each having flame retardancy (e.g., various kinds of powdery flame retardants), and an inorganic flame retardant is preferred. Examples of the inorganic flame retardant include a bromine-based flame retardant, a chlorine-based flame retardant, a phosphorus-based flame retardant, an antimony-based flame retardant, and a non-halogen-non-antimony-based inorganic flame retardant (an inorganic flame retardant free of a halogen compound and an antimony compound). Examples of the non-halogen-non-antimony-based inorganic flame retardant include aluminum hydroxide, magnesium hydroxide, and a hydrated metal compound, such as a hydrate of magnesium oxide and nickel oxide, or a hydrate of magnesium oxide and zinc oxide. The hydrated metal oxide may be subjected to surface treatment. The number of kinds of the flame retardants may be only one, or two or more.

The ester-based resin composition may contain any appropriate other component to the extent that the effect of the present invention is not impaired. Examples of such other component include a crystal nucleating agent, a plasticizer, a colorant (e.g., carbon black, a pigment, or a dye for the purpose of black coloration), a UV absorber, an antioxidant, an age resistor, a reinforcing agent, an antistatic agent, a surfactant, a tension modifier, a shrinkage preventing agent, a fluidity modifier, a vulcanizing agent, a surface treatment agent, a dispersing aid, and a modifier for a polyester resin. The number of kinds of the other components may be only one, or two or more.

The ester-based resin composition preferably contains at least the following components (i) and (ii) because a foam having a stress retention ratio equal to or higher than a predetermined value is easily obtained.

(i): An ester-based thermoplastic elastomer having a melt flow rate (MFR) at 230° C. of from 1.5 g/10 min to 4.0 g/10 min (preferably an ester-based thermoplastic elastomer having a melt flow rate (MFR) at 230° C. of from 1.5 g/10 min to 4.0 g/10 min, and being a block copolymer of a hard segment and a soft segment, more preferably a polyester-polyether type copolymer having a melt flow rate (MFR) at 230° C. of from 1.5 g/10 min to 4.0 g/10 min, and containing polyester formed by polycondensation between an aromatic dicarboxylic acid and a diol component having 2 to 4 carbon atoms in a main chain between hydroxyl groups as a hard segment, and polyether as a soft segment)

(ii): A foam nucleating agent (preferably an inorganic substance processed by surface treatment, more preferably hard clay processed by surface treatment)

<Resin Composition Containing Rubber (Rubber-Based Resin Composition)>

The rubber may be any of a natural rubber and a synthetic rubber. Examples of the rubber include a nitrile rubber (NBR), a methyl methacrylate-butadiene rubber (MBR), a styrene-butadiene rubber (SBR), an acrylic rubber (ACM or ANM), a urethane rubber (AU), and a silicone rubber. Of those, a nitrile rubber (NBR), a methyl methacrylate-butadiene rubber (MBR), and a silicone rubber are preferred.

Any appropriate content ratio may be adopted as the content ratio of the rubber in the rubber-based resin composition to the extent that the effect of the present invention is not impaired. The content ratio of the rubber in the rubber-based resin composition is preferably from 30 wt % to 100 wt %, more preferably from 50 wt % to 100 wt %, still more preferably from 70 wt % to 100 wt %, particularly preferably from 90 wt % to 100 wt % in terms of solid content.

The rubber-based resin composition may contain any appropriate other component in addition to the rubber to the extent that the effect of the present invention is not impaired. Examples of such other component include a surfactant, a cross-linking agent, a thickener, a rust inhibitor, a silicone-based compound, another polymer component, a softening agent, an antioxidant, an age resistor, a gelling agent, a curing agent, a plasticizer, a filler, a reinforcing agent, a foaming agent, a flame retardant, a light stabilizer, a UV absorber, a colorant (e.g., a pigment or a dye), a pH adjustor, a solvent (an organic solvent), a thermal polymerization initiator, and a photopolymerization initiator. The number of kinds of the other components may be only one, or two or more.

<<Pressure-Sensitive Adhesive Layer>>

The thickness of the pressure-sensitive adhesive layer is preferably from 5 μm to 300 μm, more preferably from 6 μm to 200 μm, still more preferably from 7 μm to 100 μm, particularly preferably from 8 μm to 50 μm. When the thickness of the pressure-sensitive adhesive layer falls within the above-mentioned ranges, the foam sheet of the present invention can exhibit excellent impact absorbability. In addition, when the thickness of the pressure-sensitive adhesive layer falls within the above-mentioned ranges, the foam sheet of the present invention can further raise an electrostatic capacitance at the time of compression, and hence, for example, can further improve sensitivity when used for an electrostatic capacitance sensor.

In general, as the thickness of the pressure-sensitive adhesive layer increases, a change in dielectric constant with a change in the thickness may tend to increase. However, when the thickness of the pressure-sensitive adhesive layer is excessively large, for example, there is a risk in that the force required when the foam sheet including the foam layer and the pressure-sensitive adhesive layer is pushed with a force touch may increase. Therefore, it is preferred that: the thickness of the pressure-sensitive adhesive layer fall within the above-mentioned preferred ranges; and a ratio between the thickness of the foam layer and the total thickness of the pressure-sensitive adhesive layer(s) (when the pressure-sensitive adhesive layers are arranged on both sides of the foam layer, the sum of the thicknesses of both the pressure-sensitive adhesive layers) fall within a specific range. Such ratio, expressed as "thickness of foam layer (μm)/total thickness of pressure-sensitive adhesive layer(s) (μm)," is preferably from 1 to 20, more preferably from 1.2 to 15, still more preferably from 1.4 to 10, particularly preferably from 1.5 to 7.

A layer formed of any appropriate pressure-sensitive adhesive may be adopted as the pressure-sensitive adhesive layer. Examples of a pressure-sensitive adhesive forming the pressure-sensitive adhesive layer include a rubber-based pressure-sensitive adhesive (e.g., a synthetic rubber-based pressure-sensitive adhesive or a natural rubber-based pressure-sensitive adhesive), a urethane-based pressure-sensitive adhesive, an acrylic urethane-based pressure-sensitive adhesive, an acrylic pressure-sensitive adhesive, a silicone-based pressure-sensitive adhesive, a polyester-based pressure-sensitive adhesive, a polyamide-based pressure-sensitive adhesive, an epoxy-based pressure-sensitive adhesive, a vinyl alkyl ether-based pressure-sensitive adhesive, a fluorine-based pressure-sensitive adhesive, and a rubber-based pressure-sensitive adhesive. The pressure-sensitive adhesive forming the pressure-sensitive adhesive layer is preferably at least one selected from an acrylic pressure-sensitive adhesive, a silicone-based pressure-sensitive adhesive, and a rubber-based pressure-sensitive adhesive because the effect of the present invention can be further expressed. The number of kinds of such pressure-sensitive adhesives may be only one, or two or more. The number of the pressure-sensitive adhesive layers may be one, or may be two or more.

When the pressure-sensitive adhesives are classified in terms of pressure-sensitive adhesive forms, examples thereof include an emulsion-type pressure-sensitive adhesive, a solvent-type pressure-sensitive adhesive, an ultraviolet cross-linking-type (UV cross-linking-type) pressure-sensitive adhesive, an electron beam cross-linking-type (EB cross-linking-type) pressure-sensitive adhesive, and a hot melt-type pressure-sensitive adhesive. The number of kinds of such pressure-sensitive adhesives may be only one, or two or more.

The water vapor transmission rate of the pressure-sensitive adhesive layer is preferably 50 (g/(m$^2$·24 hours)) or less, more preferably 30 (g/(m$^2$·24 hours)) or less, still more preferably 20 (g/(m$^2$·24 hours)) or less, particularly preferably 10 (g/(m$^2$·24 hours)) or less. When the water vapor transmission rate of the pressure-sensitive adhesive layer falls within the above-mentioned ranges, the dielectric constant of the foam sheet of the present invention can be stabilized without being influenced by water. In addition, when the water vapor transmission rate of the pressure-sensitive adhesive layer falls within the above-mentioned ranges, the foam sheet of the present invention can further raise an electrostatic capacitance at the time of compression, and hence, for example, can further improve sensitivity when used for an electrostatic capacitance sensor.

The pressure-sensitive adhesive forming the pressure-sensitive adhesive layer is more preferably an acrylic pressure-sensitive adhesive formed of an acrylic polymer because the effect of the present invention can be further expressed.

Any appropriate acrylic polymer that can express a pressure-sensitive adhesive property may be adopted as the acrylic polymer. The acrylic polymer may be preferably formed from monomer components essentially including an acrylic monomer. The content ratio of the acrylic monomer in all monomers that may be used for forming the acrylic polymer is preferably from 50 wt % to 100 wt %, more preferably from 60 wt % to 100 wt %, still more preferably from 70 wt % to 100 wt %, particularly preferably from 80 wt % to 100 wt %, most preferably from 90 wt % to 100 wt %. The number of kinds of the acrylic monomers may be only one, or two or more.

A preferred example of the acrylic monomer is a (meth) acrylic acid alkyl ester having an alkyl group. The (meth) acrylic acid alkyl esters each having an alkyl group may be used alone or in combination thereof. The term "(meth) acrylic" refers to "acrylic" and/or "methacrylic".

The content ratio of the (meth)acrylic acid alkyl ester having an alkyl group in the acrylic monomer is preferably from 50 wt % to 100 wt %, more preferably from 60 wt % to 99 wt %, still more preferably from 70 wt % to 98 wt %, particularly preferably from 80 wt % to 97 wt %, most preferably from 90 wt % to 96 wt % because the effect of the present invention can be further expressed.

Examples of the (meth)acrylic acid alkyl ester having an alkyl group include a (meth)acrylic acid alkyl ester having a linear or branched alkyl group, and a (meth)acrylic acid alkyl ester having a cyclic alkyl group. The term "(meth) acrylic acid alkyl ester" as used herein means a monofunctional (meth)acrylic acid alkyl ester.

Examples of the (meth)acrylic acid alkyl ester having a linear or branched alkyl group include (meth)acrylic acid alkyl esters each having an alkyl group having 1 to 20 carbon atoms, such as methyl (meth)acrylate, ethyl (meth) acrylate, propyl (meth)acrylate, isopropyl (meth)acrylate, butyl (meth)acrylate, isobutyl (meth)acrylate, sec-butyl (meth)acrylate, tert-butyl (meth)acrylate, pentyl (meth)acrylate, isopentyl (meth)acrylate, hexyl (meth)acrylate, heptyl (meth)acrylate, octyl (meth) acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth) acrylate, heptadecyl (meth) acrylate, octadecyl (meth)acrylate, nonadecyl (meth)acrylate, and eicosyl (meth)acrylate. Of those, a (meth)acrylic acid alkyl ester whose alkyl group has 4 to 12 carbon atoms is preferred, a (meth)acrylic acid alkyl ester whose alkyl group has 4 to 10 carbon atoms is more preferred, a (meth)acrylic acid alkyl ester whose alkyl group has 4 to 8 carbon atoms is still more preferred, and butyl (meth)acrylate or 2-ethylhexyl (meth)acrylate is particularly preferred.

Examples of the (meth)acrylic acid alkyl ester having a cyclic alkyl group include cyclopentyl (meth)acrylate, cyclohexyl (meth)acrylate, and isobornyl (meth)acrylate.

The (meth)acrylic acid alkyl ester having an alkyl group preferably contains at least butyl (meth)acrylate because the effect of the present invention can be further expressed. The content ratio of butyl (meth)acrylate in the (meth)acrylic acid alkyl ester having an alkyl group is preferably from 10 wt % to 100 wt %, more preferably from 30 wt % to 100 wt %, still more preferably from 50 wt % to 100 wt %, particularly preferably from 70 wt % to 100 wt %, most preferably from 90 wt % to 100 wt %.

The (meth)acrylic acid alkyl ester having an alkyl group may contain 2-ethylhexyl (meth)acrylate together with butyl (meth)acrylate so that the effect of the present invention can be further expressed. The content ratio of 2-ethylhexyl (meth)acrylate with respect to 100 parts by weight of butyl (meth)acrylate is preferably from 5 parts by weight to 200 parts by weight, more preferably from 10 parts by weight to 150 parts by weight, still more preferably from 20 parts by weight to 100 parts by weight, particularly preferably from 30 parts by weight to 90 parts by weight, most preferably from 40 parts by weight to 80 parts by weight.

The (meth)acrylic acid alkyl ester having an alkyl group is preferably as follows because the effect of the present invention can be further expressed: the total amount of butyl (meth)acrylate and 2-ethylhexyl (meth)acrylate in the entire amount of the (meth)acrylic acid alkyl ester having an alkyl group is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt %.

A polar group-containing monomer may be used as a monomer component that can form the acrylic polymer. Any appropriate polar group-containing monomer may be adopted as the polar group-containing monomer. The adoption of the polar group-containing monomer enables the cohesive strength of the acrylic polymer to be improved, or enables the pressure-sensitive adhesive strength of the acrylic polymer to be improved. The polar group-containing monomers may be used alone or in combination thereof.

Examples of the polar group-containing monomer include: carboxyl group-containing monomers, such as (meth)acrylic acid, itaconic acid, maleic acid, fumaric acid, crotonic acid, and isocrotonic acid, or anhydrides thereof (e.g., maleic anhydride); hydroxy group-containing monomers, such as hydroxyalkyl (meth)acrylates, such as hydroxyethyl (meth)acrylate, hydroxypropyl (meth)acrylate, and hydroxybutyl (meth)acrylate, vinyl alcohol, and allyl alcohol; amide group-containing monomers, such as (meth)acrylamide, N,N-dimethyl(meth)acrylamide, N-methylol(meth)acrylamide, N-methoxymethyl(meth) acrylamide, and N-butoxymethyl(meth)acrylamide; amino group-containing monomers, such as aminoethyl (meth) acrylate, dimethylaminoethyl (meth)acrylate, and t-butylaminoethyl (meth)acrylate; glycidyl group-containing monomers, such as glycidyl (meth)acrylate and methylglycidyl (meth)acrylate; cyano group-containing monomers, such as acrylonitrile and methacrylonitrile; heterocycle-containing vinyl-based monomers, such as N-vinylpyridine, N-vinylpiperidone, N-vinylpyrimidine, N-vinylpiperazine, N-vinylpyrrole, N-vinylimidazole, and N-vinyl oxazole, in addition to N-vinyl-2-pyrrolidone and (meth) acryloylmorpholine; alkoxyalkyl (meth)acrylate-based monomers, such as methoxyethyl (meth)acrylate and ethoxyethyl (meth) acrylate; sulfonic acid group-containing monomers, such as sodium vinylsulfonate; phosphoric acid group-containing monomers, such as 2-hydroxyethylacryloyl phosphate; imide group-containing monomers, such as cyclohexylmaleimide and isopropylmaleimide; and isocyanate group-containing monomers, such as 2-methacryloyloxyethyl isocyanate. The polar group-containing monomer is preferably a carboxyl group-containing monomer or an anhydride thereof, more preferably (meth)acrylic acid, still more preferably acrylic acid.

The content ratio of the polar group-containing monomer in the acrylic monomer is preferably from 0 wt % to 50 wt %, more preferably from 1 wt % to 40 wt %, still more preferably from 2 wt % to 30 wt %, particularly preferably from 3 wt % to 20 wt %, most preferably from 4 wt % to 10 wt % because the effect of the present invention can be further expressed.

A polyfunctional monomer may be used as a monomer component that can form the acrylic polymer. Any appropriate polyfunctional monomer may be adopted as the polyfunctional monomer. When the polyfunctional monomer is adopted, a cross-linked structure can be imparted to the acrylic polymer. The polyfunctional monomers may be used alone or in combination thereof.

Examples of the polyfunctional monomer include 1,9-nonanediol di(meth)acrylate, 1,6-hexanediol di(meth)acrylate, 1,4-butanediol di(meth)acrylate, (poly)ethylene glycol di(meth)acrylate, (poly)propylene glycol di(meth)acrylate, neopentyl glycol di(meth)acrylate, pentaerythritol di(meth) acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, 4-hydroxybutyl acrylate glycidyl ether, glycidyl (meth)acrylate, 2-hydroxyethyl (meth)acrylate, 2-hydroxypropyl (meth)acrylate, butanediol (meth)acrylate, 2-hydroxyethyl (meth)acrylate, 4-hydroxybutyl (meth)acrylate, glycidyl ether 2-isocyanatoethyl acrylate, isocyanatoethyl (meth)acrylate, isocyanate (meth)acrylate, triglycidyl isocyanurate, (meth)acrylic acid, phthalic acid monohydroxyethyl (meth)acrylate, hexahydrophthalic acid monohydroxyethyl (meth)acrylate, 2-hydroxyethyl (meth)acrylate, 2-hydroxypropyl (meth)acrylate, 4-hydroxybutyl (meth) acrylate, dimethyl(meth)acrylamide, diethyl(meth)acrylamide, isopropyl(meth)acrylamide, hydroxyethyl(meth)acrylamide, 1,4-butanediol diglycidyl ether, 1,2-ethanediol diglycidyl ether, polyethylene glycol diglycidyl ether, neopentyl glycol diglycidyl ether, trimethylolpropane polyglycidyl ether, hexamethylene diisocyanate, tolylene diisocyanate, diphenylmethane diisocyanate, triphenylmethane triisocyanate, methyltriisocyanatosilane, tetraisocyanatosilane, polyisocyanate, oxalic acid, malonic acid, succinic acid, glutaric acid, adipic acid, pimelic acid, suberic acid, azelaic acid, sebacic acid, phthalic acid, isophthalic acid, 1,2,3-propanetricarboxylic acid, ethylene glycol, diethylene glycol, propylene glycol, dipropylene glycol, neopentyl glycol, 1,4-butanediol, 1,6-hexanediol, 3-methyl-1,5-pentanediol, 1,2,4-butanetriol, polyoxypropylene triol, trimethylolethane, trimethylolpropane, aminomethanol, 2-aminoethanol, 3-amino-1-propanol, diethanolamine, triethanolamine, N,N-di-n-butylethanolamine, ethylenediamine, hexamethylenediamine, tolylenediamine, hydrogenated tolylenediamine, diphenylmethanediamine, hydrogenated diphenylmethanediamine, tolidine amine, naphthalenediamine, isophoronediamine, xylenediamine, hydrogenated xylenediamine, vinylamine, 2-(2-thienyl)vinylamine, 1-(allyloxy)vinylamine, allyl alcohol, 1,3-butadiene monoepoxide, and 1-vinyl-3,4-epoxycyclohexane. Of those, an acrylate-based polyfunctional monomer is preferred because the monomer has high reactivity, and 1,9-nonanediol di(meth)acrylate, 1,6-hexanediol di(meth)acrylate, and 4-hydroxybutyl acrylate glycidyl ether are more preferred.

Another copolymerizable monomer may be used as a monomer component that can form the acrylic polymer. Any appropriate other copolymerizable monomer may be adopted as the other copolymerizable monomer. The adoption of the other copolymerizable monomer enables the cohesive strength of the acrylic polymer to be improved, or enables the pressure-sensitive adhesive strength of the acrylic polymer to be improved. The other copolymerizable monomers may be used alone or in combination thereof.

Examples of the other copolymerizable monomer include: (meth)acrylic acid alkyl esters, such as a (meth)acrylic acid ester having an aromatic hydrocarbon group, such as phenyl (meth)acrylate; vinyl esters, such as vinyl acetate and vinyl propionate; aromatic vinyl compounds, such as styrene and vinyltoluene; olefins or dienes, such as ethylene, butadiene, isoprene, and isobutylene; vinyl ethers, such as a vinyl alkyl ether; vinyl chloride; alkoxyalkyl (meth)acrylate-based monomers, such as methoxyethyl (meth)acrylate and ethoxyethyl (meth)acrylate; sulfonic acid group-containing monomers, such as sodium vinyl sulfonate; phosphoric acid group-containing monomers, such as 2-hydroxyethylacryloyl phosphate; imide group-containing monomers, such as cyclohexylmaleimide and isopropylmaleimide; isocyanate group-containing monomers, such as 2-methacryloyloxyethyl isocyanate; fluorine atom-containing (meth)acrylates; and silicon atom-containing (meth)acrylates.

The weight-average molecular weight of the acrylic polymer is preferably from 100,000 to 2,000,000, more preferably from 200,000 to 1,000,000. The weight-average molecular weight of the acrylic polymer may be determined by a gel permeation chromatography method (GPC method).

The polymer component in the pressure-sensitive adhesive layer may have a cross-linked structure. When the polymer component in the pressure-sensitive adhesive layer has a cross-linked structure, the pressure-sensitive adhesive layer can express extremely excellent heat resistance.

The cross-linked structure may be constructed by any appropriate method. The cross-linked structure is preferably constructed by incorporating a cross-linking monomer into all monomer components forming the polymer component. In this case, the content ratio of the cross-linking monomer in all monomer components forming the polymer component is preferably from 2.0 wt % to 60 wt %, more preferably from 3.0 wt % to 57 wt %, still more preferably from 5.0 wt % to 55 wt %, particularly preferably from 7.0 wt % to 53 wt %, most preferably from 8.0 wt % to 50 wt %. When the content ratio of the cross-linking monomer falls within the above-mentioned ranges, the pressure-sensitive adhesive layer can express more extremely excellent heat resistance.

The number of kinds of the cross-linking monomers may be only one, or two or more.

Any appropriate cross-linking monomer may be adopted as the cross-linking monomer as long as the monomer can construct a cross-linked structure. Such cross-linking monomer is preferably, for example, a cross-linking monomer having at least one kind of functional group selected from an acryloyl group, an epoxy group, an isocyanate group, a carboxyl group, a hydroxyl group, a vinyl group, and an amino group. A specific example of such cross-linking monomer is the above-mentioned polyfunctional monomer.

The polymer component in the pressure-sensitive adhesive layer may contain any appropriate other component to the extent that the effect of the present invention is not impaired.

Examples of the other component include another polymer component, a softening agent, an age resistor, a curing agent, a plasticizer, a filler, an antioxidant, a thermal polymerization initiator, a photopolymerization initiator, a UV absorber, a light stabilizer, a colorant (e.g., a pigment or a dye), a solvent (an organic solvent), a surfactant (e.g., an ionic surfactant, a silicone-based surfactant, or a fluorine-based surfactant), and a cross-linking agent (e.g., a polyisocyanate-based cross-linking agent, a silicone-based cross-linking agent, an epoxy-based cross-linking agent, or an alkyl etherified melamine-based cross-linking agent). The thermal polymerization initiator or the photopolymerization initiator may be included in the materials for forming the polymer component.

<<<<Production Method for Foam Sheet>>>>

The foam sheet of the present invention may be produced by any appropriate method. The foam sheet of the present invention may be produced by, for example, a method involving laminating the foam layer and the pressure-sensitive adhesive layer, or a method involving laminating a material for forming the pressure-sensitive adhesive layer and the foam layer, and then forming the pressure-sensitive adhesive layer through a curing reaction or the like.

EXAMPLES

Now, the present invention is described specifically by way of Examples. However, the present invention is by no means limited to Examples. Test and evaluation methods in Examples and the like are as described below. The term "part(s)" in the following description means "part(s) by mass" unless otherwise specified, and the term "%" in the following description means "mass %" unless otherwise specified.

<Porosity of Foam Layer>

Measurement was performed under an environment having a temperature of 23° C. and a humidity of 50%. A foam layer was punched with a punching blade die measuring 100 mm by 100 mm, and the dimensions of the punched sample were measured. In addition, the thickness of the sample was measured with a 1/100 dial gauge having a measuring terminal having a diameter (($\phi$)) of 20 mm. The volume of the foam layer was calculated from those values. Next, the weight of the foam layer was measured with an even balance having a minimum scale of 0.01 g or more. The porosity (%) of the foam layer was calculated from those values.

<Average Cell Diameter of Foam Layer>

Measurement was performed under an environment having a temperature of 23° C. and a humidity of 50%. An enlarged image of a section of a foam layer was captured with a low-vacuum scanning electron microscope ("S-3400N Scanning Electron Microscope", manufactured by Hitachi High-Tech Science Systems Corporation), and the image was analyzed to determine an average cell diameter ($\mu$m). The number of cells analyzed is from about 10 to about 20. In addition, the minimum cell diameter ($\mu$m) and maximum cell diameter ($\mu$m) of the foam layer were determined by a measurement method similar to that for the measurement of the average cell diameter.

<Closed Cell Ratio of Foam Layer>

Measurement was performed under an environment having a temperature of 23° C. and a humidity of 50%. First, a measurement object was immersed in water, and then its mass was measured. After that, the measurement object was sufficiently dried in an oven at 80° C., and then its mass was measured again. In addition, open cells can hold water. Therefore, the corresponding mass was measured as open cells.

<Water Content after High-Humidity Storage of Foam Sheet>

Under an environment having a temperature of 23° C. and a humidity of 50%, the foam sheet was punched with a punching blade die measuring 100 mm by 100 mm, and the dimensions of the punched sample were measured. In addition, the thickness of the sample was measured with a 1/100 dial gauge having a measuring terminal having a diameter ($\phi$) of 20 mm. The volume of the foam sheet was calculated from those values. Next, the weight of the foam sheet was measured with an even balance having a minimum scale of 0.01 g or more. The foam sheet was stored under an environment having a temperature of 60° C. and a humidity of 95% for 24 hours. After the foam sheet had been removed from the environment, the weight of the foam sheet was measured with an even balance having a minimum scale of 0.01 g or more. A water content was calculated on the basis of a change between the weights before and after the high-humidity storage.

<Dielectric Constant of Foam Sheet>

Under an environment having a temperature of 23° C. and a humidity of 50%, a dielectric constant was measured using an E4980A precision LCR meter (Agilent Technologies). The measurement was performed by a parallel-plate capacitor method (based on JIS C 2138) at compression ratios of 10%, 20%, 30%, 40%, 50%, 60%, and 70%.

<Impact Absorbability of Foam Sheet>

Under an environment having a temperature of 23° C. and a humidity of 50%, an impact absorbability test was performed using a pendulum impact tester (impact test apparatus) (see FIG. 3 and FIG. 4). A foam sheet (sample size: 20 mm×20 mm) was subjected to an impact test by causing an iron ball of 66 g to collide therewith 5 times in succession at intervals of 1 second under such a condition that the iron ball was inclined by 40°, and an impact force (N) at the time of each collision was measured.

<Repulsive Force at 50% Compression of Foam Sheet>

Under an environment having a temperature of 23° C. and a humidity of 50%, a repulsive force at 50% compression was measured as a repulsive force (N/cm$^2$) in conformity with a method of measuring a compression hardness described in JIS K 6767:1999 by dividing a stress (N) at a time when a sheet-shaped test piece cut out from a foam sheet so as to measure 30 mm wide by 30 mm long was compressed in a thickness direction thereof at a compression speed of 10 mm/min until a compression ratio of 50% was achieved, by the area of the test piece (9 cm$^2$) to convert the stress into a value per unit area (1 cm$^2$).

Production Example 1

(Production of Foam Layer (A))

100 Parts by weight of an acrylic emulsion solution (solid content: 55%, ethyl acrylate-butyl acrylate-acrylonitrile copolymer (weight ratio: 45:48:7)), 1.5 parts by weight of a fatty acid ammonium-based surfactant (water dispersion of ammonium stearate, solid content: 33%) (surfactant A), 1.0 part by weight of a carboxybetaine-type amphoteric surfactant ("AMOGEN CB-H", manufactured by DKS Co., Ltd.) (surfactant B), 0.35 part by weight of an oxazoline-based cross-linking agent ("EPOCROS WS-500", manufactured by Nippon Shokubai Co., Ltd., solid content: 39%), and 0.78 part by weight of a polyacrylic acid-based thickener (ethyl acrylate-acrylic acid copolymer (acrylic acid: 20%), solid content: 28.7%) were stirred and mixed with a disper ("ROBOMIX", manufactured by Primix Corporation) to be foamed. The foam composition was applied onto a release-treated polyethylene terephthalate (PET) film (thickness: 38 μm, product name: "MRF #38", manufactured by Mitsubishi Plastics, Inc.), and was dried at 80° C. for 5 minutes and at 140° C. for 5 minutes to provide a foam layer (A) of an open-cell structure having a thickness of 100 μm, a density of 0.32 g/cm$^3$, a maximum cell diameter of 110 μm, a minimum cell diameter of 20 μm, and an average cell diameter of 50 μm.

Production Example 2

(Production of Foam Layer (B))

A foam layer (B) having a thickness of 150 μm was obtained by adjusting the thickness of the foam layer to be obtained to 150 μm in the production of the foam layer (A) of Production Example 1.

Production Example 3

(Production of Foam Layer (C))

45 Parts by weight of polypropylene (melt flow rate (MFR) (230° C.)=0.35 g/10 min), 55 parts by weight of a polyolefin-based elastomer (melt flow rate (MFR)=6 g/10 min, JIS-A hardness=79°, 10 parts by weight of magnesium hydroxide, 10 parts by weight of carbon (product name: "ASAHI #35", manufactured by Asahi Carbon Co., Ltd.), 1 part by weight of stearic acid monoglyceride, and 2 parts by weight of a fatty acid amide (lauric acid bisamide) were kneaded with a twin screw kneader manufactured by the Japan Steel Works, Ltd. (JSW) at a temperature of 200° C. After that, the kneaded product was extruded into a strand shape, and was cooled with water, followed by forming into a pellet shape.

The pellet was loaded into a single screw extruder manufactured by the Japan Steel Works, Ltd., and under an atmosphere at 220° C., a carbon dioxide gas was injected into the pellet at a pressure of 13 (12 after the injection) MPa. The carbon dioxide gas was injected at a ratio of 6 parts by weight with respect to 100 parts by weight of the polymer. After the carbon dioxide gas had been sufficiently saturated, the pellet was cooled to a temperature suitable for foaming, and was then extruded from a die to provide a foam. Then, the resin foam was sliced, and was further adjusted to a predetermined thickness with a hot press to provide a foam layer (C) of a cell structure having a thickness of 100 μm, a density of 0.10 g/cm$^3$, a maximum cell diameter of 80 μm, a minimum cell diameter of 20 μm, an average cell diameter of 60 μm, and a closed cell ratio of 50%.

Production Example 4

(Production of Foam Layer (D))

A foam layer (D) having a thickness of 150 μm was obtained by adjusting the thickness of the foam layer to be obtained to 150 μm in the production of the foam layer (C) of Production Example 3.

Production Example 5

(Production of Pressure-Sensitive Adhesive Layer (A))

A reaction vessel with a stirrer, a temperature gauge, a nitrogen gas inlet tube, a reflux condenser, and a dropping funnel was loaded with 100 parts of butyl acrylate (BA) and 5 parts of acrylic acid (AA) serving as monomer components, and 135 parts of toluene serving as a polymerization solvent, and while a nitrogen gas was introduced, the contents were stirred for 2 hours. After oxygen in the polymerization system had been thus removed, 0.1 part of azobisisobutyronitrile (AIBN) serving as a polymerization initiator was added, and solution polymerization was performed at 60° C. for 6 hours to provide a toluene solution of an acrylic polymer. The Mw of the acrylic polymer was 40×10$^4$.

30 Parts of a polymerized rosin ester (product name: "PENSEL D-125", softening point: 120° C. to 130° C., manufactured by Arakawa Chemical Industries, Ltd.) serving as a tackifying resin and 2 parts of an isocyanate-based cross-linking agent (product name: "CORONATE L", manufactured by Tosoh Corporation, solid content: 75%) were added with respect to 100 parts of the acrylic polymer contained in the toluene solution to prepare an acrylic pressure-sensitive adhesive composition. The acrylic pressure-sensitive adhesive composition was applied onto a release-treated polyethylene terephthalate (PET) film (thickness: 38 μm, product name: "MRF #38", manufactured by Mitsubishi Plastics, Inc.), and was dried at 120° C. for 5 minutes to provide a pressure-sensitive adhesive layer (A) having a thickness of 30 μm.

Production Example 6

(Production of Pressure-Sensitive Adhesive Layer (B))

A pressure-sensitive adhesive layer (B) having a thickness of 10 μm was obtained by adjusting the thickness of the pressure-sensitive adhesive layer to be obtained to 10 µm in the production of the pressure-sensitive adhesive layer (A) of Production Example 5.

Production Example 7

(Production of Pressure-Sensitive Adhesive Layer (C))

A reaction vessel with a stirrer, a temperature gauge, a nitrogen gas inlet tube, a reflux condenser, and a dropping funnel was loaded with 60 parts of butyl acrylate (BA), 40 parts of 2-ethylhexyl acrylate (2EHA), and 5 parts of acrylic acid (AA) serving as monomer components, and 135 parts of toluene serving as a polymerization solvent, and while a nitrogen gas was introduced, the contents were stirred for 2 hours. After oxygen in the polymerization system had been thus removed, 0.1 part of azobisisobutyronitrile (AIBN) serving as a polymerization initiator was added, and solution polymerization was performed at 60° C. for 6 hours to provide a toluene solution of an acrylic polymer. The Mw of the acrylic polymer was $40 \times 10^4$.

30 Parts of a polymerized rosin ester (product name: "PENSEL D-125", softening point: 120° C. to 130° C., manufactured by Arakawa Chemical Industries, Ltd.) serving as a tackifying resin and 2 parts of an isocyanate-based cross-linking agent (product name: "CORONATE L", manufactured by Tosoh Corporation, solid content: 75%) were added with respect to 100 parts of the acrylic polymer contained in the toluene solution to prepare an acrylic pressure-sensitive adhesive composition. The acrylic pressure-sensitive adhesive composition was applied onto a release-treated polyethylene terephthalate (PET) film (thickness: 38 µm, product name: "MRF #38", manufactured by Mitsubishi Plastics, Inc.), and was dried at 120° C. for 5 minutes to provide a pressure-sensitive adhesive layer (C) having a thickness of 30 µm.

Example 1

With the use of the foam layer (A) obtained in Production Example 1 and the pressure-sensitive adhesive layer (A) obtained in Production Example 5, the pressure-sensitive adhesive layer was bonded to each of both sides of the foam layer to provide a foam sheet (1) having a three-layer structure of "pressure-sensitive adhesive layer (A)/foam layer (A)/pressure-sensitive adhesive layer (A)." The results are shown in Table 1.

Example 2

With the use of the foam layer (A) obtained in Production Example 1 and the pressure-sensitive adhesive layer (A) obtained in Production Example 5, the pressure-sensitive adhesive layer was bonded to one side of the foam layer to provide a foam sheet (2) having a two-layer structure of "foam layer (A)/pressure-sensitive adhesive layer (A)." The results are shown in Table 1.

Example 3

With the use of the foam layer (A) obtained in Production Example 1 and the pressure-sensitive adhesive layer (B) obtained in Production Example 6, the pressure-sensitive adhesive layer was bonded to each of both sides of the foam layer to provide a foam sheet (3) having a three-layer structure of "pressure-sensitive adhesive layer (B)/foam layer (A)/pressure-sensitive adhesive layer (B)." The results are shown in Table 1.

Example 4

With the use of the foam layer (A) obtained in Production Example 1 and the pressure-sensitive adhesive layer (B) obtained in Production Example 6, the pressure-sensitive adhesive layer was bonded to one side of the foam layer to provide a foam sheet (4) having a two-layer structure of "foam layer (A)/pressure-sensitive adhesive layer (B)." The results are shown in Table 1.

Example 5

With the use of the foam layer (C) obtained in Production Example 3 and the pressure-sensitive adhesive layer (A) obtained in Production Example 5, the pressure-sensitive adhesive layer was bonded to each of both sides of the foam layer to provide a foam sheet (5) having a three-layer structure of "pressure-sensitive adhesive layer (A)/foam layer (C)/pressure-sensitive adhesive layer (A)." The results are shown in Table 1.

Example 6

With the use of the foam layer (C) obtained in Production Example 3 and the pressure-sensitive adhesive layer (A) obtained in Production Example 5, the pressure-sensitive adhesive layer was bonded to one side of the foam layer to provide a foam sheet (6) having a two-layer structure of "foam layer (C)/pressure-sensitive adhesive layer (A)." The results are shown in Table 1.

Example 7

With the use of the foam layer (A) obtained in Production Example 1 and the pressure-sensitive adhesive layer (C) obtained in Production Example 7, the pressure-sensitive adhesive layer was bonded to each of both sides of the foam layer to provide a foam sheet (7) having a three-layer structure of "pressure-sensitive adhesive layer (C)/foam layer (A)/pressure-sensitive adhesive layer (C)." The results are shown in Table 1.

Example 8

With the use of the foam layer (A) obtained in Production Example 1 and the pressure-sensitive adhesive layer (C) obtained in Production Example 7, the pressure-sensitive adhesive layer was bonded to one side of the foam layer to provide a foam sheet (8) having a two-layer structure of "foam layer (A)/pressure-sensitive adhesive layer (C)." The results are shown in Table 1.

Comparative Example 1

The foam layer (A) obtained in Production Example 1 was used alone as a foam sheet (C1). The results are shown in Table 1.

Comparative Example 2

The foam layer (B) obtained in Production Example 2 was used alone as a foam sheet (C2). The results are shown in Table 1.

Comparative Example 3

The foam layer (C) obtained in Production Example 3 was used alone as a foam sheet (C3). The results are shown in Table 1.

Comparative Example 4

The foam layer (D) obtained in Production Example 4 was used alone as a foam sheet (C4). The results are shown in Table 1.

TABLE 1

| | Example 1 | Example 2 | Example 3 | Example 4 | Example 5 | Example 6 | Example 7 |
|---|---|---|---|---|---|---|---|
| Layer configuration<br>(1) Pressure-sensitive adhesive layer/foam layer/pressure-sensitive adhesive layer<br>(2) Foam layer/pressure-sensitive adhesive layer<br>(3) Foam layer | (1) | (2) | (1) | (2) | (1) | (2) | (1) |
| Foam layer | (A) | (A) | (A) | (A) | (C) | (C) | (A) |
| Foam layer thickness (μm) | 100 | 100 | 100 | 100 | 100 | 100 | 100 |
| Pressure-sensitive adhesive layer | (A) | (A) | (B) | (B) | (A) | (A) | (C) |
| Pressure-sensitive adhesive layer total thickness (μm) | 60 | 30 | 20 | 10 | 60 | 30 | 60 |
| Ratio of foam layer/pressure-sensitive adhesive layer | 1.7 | 3.3 | 5 | 10 | 1.7 | 3.3 | 1.7 |
| Porosity (%) | 70 | 70 | 70 | 70 | 90 | 90 | 70 |
| Average cell diameter (μm) | 50 | 50 | 50 | 50 | 60 | 60 | 50 |
| Closed cell ratio (%) | 0 | 0 | 0 | 0 | 50 | 50 | 0 |
| Repulsive force at 50% compression (N/cm$^2$) | 6.7 | 4.2 | 5.6 | 3.6 | 3.0 | 2.8 | 6.6 |
| Dielectric constant P (F/m) | 3.7 | 3.4 | 3.2 | 3.0 | 2.9 | 2.7 | 3.6 |
| Dielectric constant Q at 10% compression (F/m) | 4.2 | 3.9 | 3.6 | 3.4 | 3.2 | 3.0 | 4.0 |
| Dielectric constant R at 50% compression (F/m) | 5.0 | 4.4 | 4.0 | 3.7 | 3.5 | 3.2 | 4.5 |
| Dielectric constant increase amount Q-P at 10% compression | 0.5 | 0.5 | 0.4 | 0.4 | 0.3 | 0.3 | 0.4 |
| Dielectric constant increase amount R-P at 50% compression | 1.3 | 1.0 | 0.8 | 0.7 | 0.6 | 0.5 | 0.9 |

| | Example 8 | Comparative Example 1 | Comparative Example 2 | Comparative Example 3 | Comparative Example 4 |
|---|---|---|---|---|---|
| Layer configuration<br>(1) Pressure-sensitive adhesive layer/foam layer/pressure-sensitive adhesive layer<br>(2) Foam layer/pressure-sensitive adhesive layer<br>(3) Foam layer | (2) | (3) | (3) | (3) | (3) |
| Foam layer | (A) | (A) | (B) | (C) | (D) |
| Foam layer thickness (μm) | 100 | 100 | 150 | 100 | 150 |
| Pressure-sensitive adhesive layer | (C) | — | — | — | — |
| Pressure-sensitive adhesive layer total thickness (μm) | 30 | 0 | 0 | 0 | 0 |
| Ratio of foam layer/pressure-sensitive adhesive layer | 3.3 | — | — | — | — |
| Porosity (%) | 70 | 70 | 70 | 90 | 90 |
| Average cell diameter (μm) | 50 | 50 | 50 | 60 | 60 |
| Closed cell ratio (%) | 0 | 0 | 0 | 50 | 50 |
| Repulsive force at 50% compression (N/cm$^2$) | 4.4 | 3.3 | 3.4 | 2.3 | 1.5 |
| Dielectric constant P (F/m) | 3.4 | 2.7 | 2.8 | 1.8 | 1.8 |
| Dielectric constant Q at 10% compression (F/m) | 3.7 | 2.8 | 2.9 | 1.8 | 1.8 |
| Dielectric constant R at 50% compression (F/m) | 4.0 | 2.9 | 3 | 1.9 | 1.9 |
| Dielectric constant increase amount Q-P at 10% compression | 0.3 | 0.1 | 0.1 | 0.0 | 0.0 |
| Dielectric constant increase amount R-P at 50% compression | 0.6 | 0.2 | 0.2 | 0.1 | 0.1 |

INDUSTRIAL APPLICABILITY

The foam sheet of the present invention can be suitably applied as an impact absorption sheet for an electronic device.

REFERENCE SIGNS LIST

1 pendulum impact tester (impact test apparatus)
2 test piece (foam sheet)
3 holding member
4 impact applying member
5 pressure sensor
11 fixing jig
12 pressing jig
16 pressure adjusting means
20 support column
21 arm
22 one end of support rod (shaft)
23 support rod (shaft)
24 impactor
25 electromagnet
28 support plate
a swing-up angle 100 foam layer
200 pressure-sensitive adhesive layer
200a pressure-sensitive adhesive layer
200b pressure-sensitive adhesive layer
1000 foam sheet

The invention claimed is:

1. A foam sheet, comprising:
a foam layer; and
a pressure-sensitive adhesive layer arranged on at least one side of the foam layer,
wherein
a ratio of a thickness of the foam layer to a thickness of the pressure-sensitive adhesive layer thickness is in a range of 1.5 to 10, and
the foam sheet has a dielectric constant increase amount Q-P at 10% compression of 0.2 (F/m) or more, where P (F/m) represents a dielectric constant of the foam sheet immediately after the foam sheet has been left at rest under conditions of a temperature of 23° C. and a humidity of 50% for 2 hours, and Q (F/m) represents a dielectric constant of the foam sheet at a time when the foam sheet is compressed by 10% immediately after being left at rest under the conditions of a temperature of 23° C. and a humidity of 50% for 2 hours.

2. The foam sheet according to claim 1, wherein the foam sheet has a dielectric constant increase amount R-P at 50% compression of 0.3 (F/m) or more, where R (F/m) represents a dielectric constant of the foam sheet at a time when the foam sheet is compressed by 50% immediately after being left at rest under the conditions of a temperature of 23° C. and a humidity of 50% for 2 hours.

3. The foam sheet according to claim 1, wherein the thickness of the foam layer is from 30 μm to 1,000 μm.

4. The foam sheet according to claim 1, wherein the foam layer has an average cell diameter of from 10 μm to 200 μm.

5. The foam sheet according to claim 1, wherein the foam layer has a porosity of from 20% to 80%.

6. The foam sheet according to claim 1, wherein the foam layer has a closed cell ratio of from 0% to 80%.

7. The foam sheet according to claim 1, wherein the foam layer is formed from a resin composition containing at least one kind selected from an acrylic polymer, a silicone-based polymer, a urethane-based polymer, an olefin-based polymer, an ester-based polymer, and a rubber.

8. The foam sheet according to claim 1, wherein the thickness of the pressure-sensitive adhesive layer is from 5 μm to 300 μm.

9. The foam sheet according to claim 1, wherein a pressure-sensitive adhesive forming the pressure-sensitive adhesive layer is at least one kind selected from an acrylic pressure-sensitive adhesive, a silicone-based pressure-sensitive adhesive, and a rubber-based pressure-sensitive adhesive.

10. The foam sheet according to claim 1, wherein the foam sheet has a thickness of from 35 μm to 1,300 μm.

11. The foam sheet according to claim 1, wherein the foam sheet has a repulsive force at 50% compression of from 0.1 N/cm$^2$ to 20.0 N/cm$^2$,
the repulsive force at 50% compression being measured as a repulsive force (N/cm$^2$) in conformity with a method of measuring a compression hardness described in JIS K 6767:1999 by dividing a stress (N) at a time when a sheet-shaped test piece cut out from the foam sheet so as to measure 30 mm wide by 30 mm long is compressed in a thickness direction thereof at a compression speed of 10 mm/min until a compression ratio of 50% is achieved, by an area of the test piece (9 cm$^2$) to convert the stress into a value per unit area (1 cm$^2$).

12. The foam sheet according to claim 1, wherein the foam sheet is used for an electrostatic capacitance sensor.

\* \* \* \* \*